(12) United States Patent
Watanabe et al.

(10) Patent No.: US 7,160,376 B2
(45) Date of Patent: Jan. 9, 2007

(54) AQUEOUS INK, AND INK-JET RECORDING METHOD, INK-JET RECORDING APPARATUS, AND IMAGE FORMING METHOD USING THE SAME

(75) Inventors: Tomonari Watanabe, Kanagawa (JP); Mikio Sanada, Kanagawa (JP); Masashi Ogasawara, Tokyo (JP); Yui Tokuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/833,111

(22) Filed: Apr. 28, 2004

(65) Prior Publication Data

US 2004/0252170 A1 Dec. 16, 2004

(30) Foreign Application Priority Data

May 2, 2003 (JP) ............................. 2003-127475

(51) Int. Cl.
*C09D 11/00* (2006.01)
*G01D 11/00* (2006.01)

(52) U.S. Cl. ................. 106/31.6; 106/31.89; 106/31.9; 347/100

(58) Field of Classification Search ............... 106/31.6, 106/31.89, 31.9; 347/100
See application file for complete search history.

(56) References Cited

U.S. PATENT DOCUMENTS

| | | | | |
|---|---|---|---|---|
| 5,571,311 A * | 11/1996 | Belmont et al. | .......... | 106/31.28 |
| 5,656,071 A * | 8/1997 | Kappele et al. | .......... | 106/31.76 |
| 5,700,317 A * | 12/1997 | Adamic | ............ | 106/31.58 |
| 5,951,749 A * | 9/1999 | Krepski et al. | .......... | 106/31.75 |
| 6,034,153 A * | 3/2000 | Tsang et al. | ............ | 523/160 |
| 6,040,358 A * | 3/2000 | Page et al. | ............ | 523/161 |
| 6,153,001 A | 11/2000 | Suzuki et al. | ............ | 106/31.65 |
| 6,221,141 B1 | 4/2001 | Takada et al. | ............ | 106/31.6 |
| 6,280,513 B1 | 8/2001 | Osumi et al. | ............... | 106/31.6 |
| 6,332,919 B1 | 12/2001 | Osumi et al. | ............... | 106/31.6 |
| 6,375,317 B1 | 4/2002 | Osumi et al. | ............... | 347/100 |
| 6,440,203 B1 * | 8/2002 | Kato | ........................ | 106/31.6 |
| 6,500,248 B1 * | 12/2002 | Hayashi | ................... | 106/31.86 |
| 6,511,534 B1 | 1/2003 | Mishina et al. | .......... | 106/31.33 |
| 6,521,034 B1 | 2/2003 | Osumi et al. | ............... | 106/31.6 |
| 6,547,381 B1 | 4/2003 | Watanabe et al. | .......... | 347/100 |
| 6,572,692 B1 * | 6/2003 | Osumi et al. | ............... | 106/31.6 |
| 6,613,136 B1 * | 9/2003 | Arita et al. | ............... | 106/31.58 |
| 2001/0020431 A1 | 9/2001 | Osumi et al. | ............... | 106/31.6 |
| 2002/0088375 A1 | 7/2002 | Komatsu et al. | .......... | 106/472 |
| 2003/0195275 A1 | 10/2003 | Sanada et al. | .............. | 523/160 |
| 2004/0069183 A1 * | 4/2004 | Kamoto et al. | .......... | 106/31.27 |
| 2004/0099182 A1 * | 5/2004 | Kamoto et al. | .......... | 106/31.59 |

FOREIGN PATENT DOCUMENTS

| | | |
|---|---|---|
| EP | 1 146 090 A2 | 10/2001 |
| EP | 1 148 103 A2 | 10/2001 |

(Continued)

*Primary Examiner*—J. A. Lorengo
*Assistant Examiner*—Veronica Faison-Gee
(74) *Attorney, Agent, or Firm*—Fitzpatrick, Cella, Harper & Scinto

(57) ABSTRACT

An aqueous ink comprising at least water, a water-soluble organic solvent and a colorant.

The colorant comprises a pigment containing a pigment particle having at least one ionic group bonded to a surface of the pigment particle directly or via another atomic group.

The organic solvent undergoes completely or substantially no solvation with the pigment and the ionic group of the pigment particle undergoes completely or substantially no ion dissociation in the organic solvent.

14 Claims, 7 Drawing Sheets

FOREIGN PATENT DOCUMENTS

| | | |
|---|---|---|
| JP | 2000-63719 A | 2/2000 |
| JP | 2000-198955 A | 7/2000 |
| WO | WO/9747699 | 12/1997 |
| WO | WO 02/26901 A2 | 4/2002 |

* cited by examiner

AQUEOUS INK, AND INK-JET RECORDING METHOD, INK-JET RECORDING APPARATUS, AND IMAGE FORMING METHOD USING THE SAME

BACKGROUND OF THE INVENTION

1. Field of the Invention

The present invention relates to an aqueous ink containing water, a water-soluble organic solvent, and a colorant. More specifically, the present invention relates to an aqueous ink suitable for an ink-jet recording method (image forming method or recording method) or for an ink-jet recording apparatus, and to an ink-jet recording method, ink-jet recording apparatus, and image forming method using the same.

2. Related Background Art

Ink containing a pigment as a colorant (pigment ink) has been conventionally known to provide an image excellent in color-fastness such as water resistance or light resistance. Various techniques have been proposed in recent years for further improving an optical density of an image formed by such ink and for more efficiently suppressing color mixing (bleeding) at a boundary portion between respective color images when recording a color image in which areas of different colors are adjacent to each other.

For example, there has been proposed a technique in which ink containing self-dispersible carbon black and a specific salt is used to further improve an image density (see, for instance, JP 2000-198955 A). There has been also proposed a technique in which ink for ink-jet recording, which is a composition containing a pigment, a polymer fine particle, a water-soluble organic solvent, and water, and a polyvalent-metal-salt-containing aqueous solution are allowed to adhere to a recording medium, and the ink composition and the polyvalent-metal-salt-containing aqueous solution are reacted to form a high-quality image (see, for instance, JP 2000-063719 A).

In each of those techniques, pigments dispersed in the ink are forced to aggregate on the surface of the recording medium to suppress permeation of the pigments into the recording medium, thereby resulting in an image having a higher density and suppressed bleeding as compared to an image provided by the conventional pigment ink.

As described above, in forming a high-quality image having a high density and suppressed bleeding, methods have been mainly utilized, which include a method involving separately incorporating a compound into ink and a method involving the reaction between two or more kinds of liquids.

However, ink components are preferably simplified. It has been generally desired to form a high-quality image comparable to that described above by appropriately designing basic components constituting an aqueous ink such as a colorant and a water-soluble organic solvent, and by controlling the combinations and the like of the basic components.

SUMMARY OF THE INVENTION

Therefore, an object of the present invention is to provide an aqueous ink capable of providing an image having a high O. D. (optical density) and suppressed color mixing (bleeding) at a boundary portion between color images when recording a color image in which areas of different colors are adjacent to each other by simplifying ink components of a pigment ink and by eliminating as much as possible dependence of the components on external factors to suppress a detrimental effect caused by a combined action or the like.

Another object of the present invention is to provide an ink-jet recording method and an ink-jet recording apparatus which are capable of forming a high-quality image having a high O.D. and suppressed bleeding by means of such ink.

Still another object of the present invention is to provide an image forming method by which color mixing (bleeding) at a boundary portion between color images can be efficiently suppressed when recording on plain paper a color image in which areas of different colors are adjacent to each other.

The above objects can be achieved according to aspects of the present invention as described below. That is, according to an aspect of the present invention, there is provided an aqueous ink including at least: water; a water-soluble organic solvent; and a colorant, in which:

the colorant includes a pigment containing a pigment particle having at least one ionic group bonded to its surface directly or via another atomic group; and the organic solvent undergoes completely or substantially no solvation with the pigment and the at least one ionic group of the pigment particle undergoes completely or substantially no ion dissociation in the organic solvent.

Furthermore, according to another aspect of the present invention, there is provided an ink-jet recording method including ejecting the ink according to the aspect of the present invention by an ink-jet recording system.

Furthermore, according to another aspect of the present invention, there is provided an ink-jet recording apparatus including: an ink containing portion that contains the aqueous ink according to the aspect of the present invention; and a recording head for ejecting the ink.

Furthermore, according to another aspect of the present invention, there is provided an image forming method for performing recording on plain paper by an ink-jet recording system by using a black ink and at least one aqueous color ink. The method includes performing a scan for applying the aqueous black ink according to the aspect of the present invention as the black ink to form an image, and performing a scan for applying the color ink on an area where the image is formed to form an image adjacent to the image to thereby form an image composed of the image formed by the black ink and the image formed by the color ink.

DESCRIPTION OF THE PREFERRED EMBODIMENTS

Hereinafter, the present invention will be described in more detail by way of the modes for carrying out the invention. The present invention is characterized in that, considering a combination of a colorant and a water-soluble organic solvent which are basic components constituting aqueous ink, a pigment with at least one ionic group bonded to the surface directly or via another atomic group is used as the colorant, and the pigment and the water-soluble organic solvent establish the above-mentioned particular relationship.

It has been found that due to the above-mentioned configuration, the following remarkable effects are obtained: an image with bleeding reduced is formed even with respect to plain paper that conventionally has various problems in forming an image with aqueous ink; ink capable of forming an image with high O.D. is obtained; using such ink enables a high-speed printing and a small-sized recording apparatus; excellent color-fastness and a much higher image density are realized; and a high-quality image with reduced bleeding can be formed. Thus, the present invention has been completed.

Although the reason why such effects are obtained according to the present invention is not clear, the inventors of the present invention make the following guess. Generally, in order to realize an excellent printing density and printing quality in the case where an image is formed on a recording sheet such as plain paper with aqueous ink, it is necessary to allow a colorant to remain on the paper surface efficiently. Furthermore, in order to obtain an image with bleeding suppressed in a boundary portion of images of respective colors in the case of performing color image recording in which areas of different colors are adjacent to each other, it is necessary that colorants in the boundary portion are suppressed from flowing to an adjacent area.

Figure 14A:
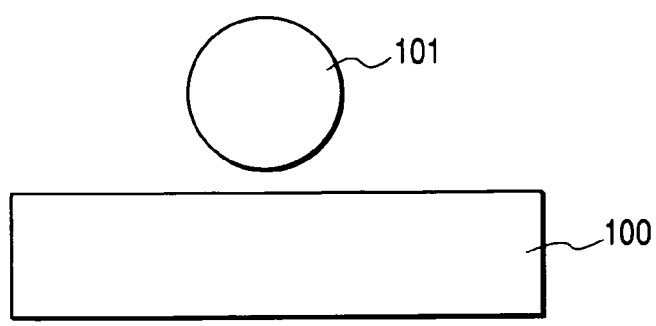
FIGS. 14A, 14B, 14C and 14D are views each schematically explaining a state where an ink droplet of the present invention impacts on the surface of a recording medium.

More specifically, as shown in FIG. 14A, in the case where an ink droplet 101 of the present invention is printed onto a recording medium 100 (e.g., plain paper), immediately after ink impacts against the recording medium, the ratio among water, a water-soluble organic solvent, and a colorant in ink changes. That is, the following is considered. As ink is being fixed-onto the recording medium after the ink droplet impacts against the surface of the recording medium, the water-soluble organic solvent in ink first permeates the inside of the recording medium along with the evaporation of water.

Figure 14B:
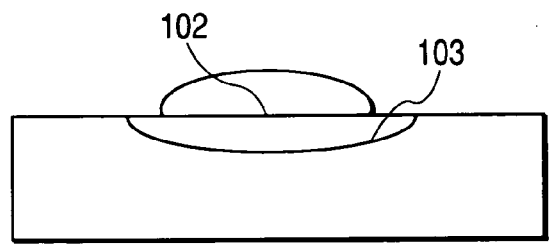

In this case, it is considered that the concentration of the water-soluble organic solvent is higher in an outer circumferential portion 103 of the permeated liquid than in a center portion 102 of a dot, as shown in FIG. 14B. Consequently, the ratio of the water-soluble organic solvent with respect to the colorant rapidly increases in the outer circumferential portion 103 of the permeated liquid. The water-soluble organic solvent undergoes substantially no solvation with the colorant, and an ionic group of the colorant is not substantially dissociated in the water-soluble organic solvent. Therefore, the dispersion of the colorant becomes unstable very efficiently, and the aggregation or dispersion destruction of the colorant occurs, so that the colorant starts precipitating.

Figure 14C:
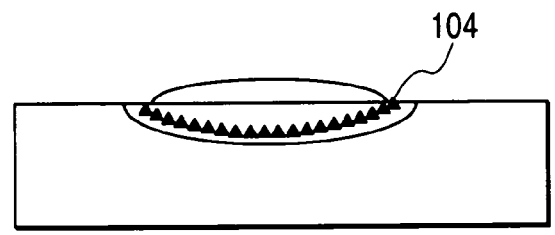
Figure 14D:
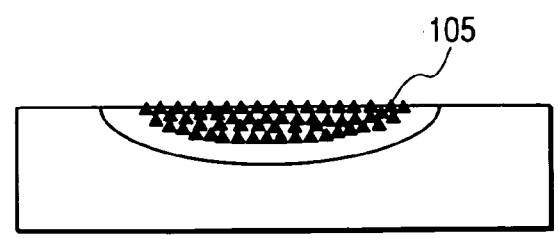

Then, as shown in FIG. 14C, it is considered that, the colorant 104 precipitated by aggregation or dispersion destruction seems to constitute a bank. Subsequently, the evaporation, permeation, and the like of water and the water-soluble organic solvent proceed in the center portion of the dot, and the colorant is precipitated successively, whereby a final dot 105 is formed (FIG. 14D).

At an initial stage after ink impacts against the recording medium, the permeation depth and spreading degree of the colorant to the inside of the recording medium are determined, so that the excess permeation of the colorant into the recording medium and the excess flowing thereof to an adjacent area are suppressed. As a result, an image formed by the above-mentioned process has high quality with a high O.D. (reflective optical density) and reduced bleeding.

Next, the phenomenon will be described in which the water-soluble organic solvent undergoes completely or substantially no solvation with a pigment with at least one ionic group bonded to the surface directly or via another atomic group, and the ionic group of the pigment is not dissociated at all or substantially in the water-soluble organic solvent.

In the pigment with at least one ionic group bonded to the surface directly or via another atomic group, the ionic groups are dissociated in a medium, whereby pigment particles are charged. The electrostatic repulsive force thus caused becomes one factor for dispersing the pigment particles in the medium. It can be considered that there is attracting force between ions in the medium as one index of the ion dissociation. The following is known: when two charges q1 and q2 having different polarities are placed at a distance r in a medium having a specific dielectric constant $\epsilon r$ with respect to a dielectric constant $\epsilon 0$ in vacuum, an attracting force F between the two charges is represented by the following expression:

$$F = q1 q2/(4\pi \epsilon r \epsilon 0 r^2) \quad \text{Expression (1)}$$

Expression (1) above can be applied to ionic groups bonded to the surface of the pigment. When the attracting force F increases, the distance between an ion of the ionic group and a counter ion thereof becomes short or ions are bonded to each other completely. Consequently, the charge amount of the pigment particles decreases or an electric double layer is compressed to weaken an electrostatic repulsing force, whereby the dispersion of the pigment particles becomes unstable. As apparent from Expression (1) above, in the case of using a water-soluble organic solvent having the small specific dielectric constant $\epsilon r$ with respect to the dielectric constant $\epsilon 0$ in vacuum, the attracting force between the ion of ionic group bonded to the surface of the pigment and the counter ion thereof increases, and ionic groups of the colorant do not substantially cause ion dissociation in the water-soluble organic solvent, whereby the dispersibility of the pigment particles due to the electrostatic repulsing force decreases.

The specific dielectric constant $\epsilon r$ with respect to the dielectric constant $\epsilon 0$ in vacuum of the water-soluble organic solvent in the present invention at room temperature (e.g., 25° C.) is preferably 35 or less, more preferably 30 or less.

However, it was difficult to explain the dispersibility of the pigment only based on the degree of dissociation of ionic groups with respect to a solvent.

The inventors of the present invention have focused on the solvation of a medium with respect to a pigment as another factor influencing the dispersion of the pigment particles. The solvation in the present invention refers to the affinity between the pigment and the solvent, and depends upon to which degree the pigment has a site with affinity for the medium. As an example of the site with affinity for the medium, there is a surface site of pigment particles to which ionic groups are not bonded. For example, in the case where ionic groups are bonded to the surface of the pigment particles at a high density, the following is assumed. An exposure area of the site of the pigment surface with affinity for the medium decreases. Furthermore, due to a synergistic effect with the influence of steric hindrance caused by ionic groups covering the pigment surface at a high density, the medium is unlikely to undergo solvation with the pigment, and the dispersibility of the pigment decreases.

When a combination of a colorant and a water-soluble organic solvent, in which the above-mentioned dispersion due to the electrostatic repulsion caused by the ion dissociation of the ionic groups and the dispersion due to the salvation of the medium with respect to the colorant do not occur at all or substantially, is applied to aqueous ink, respective components act synergistically, and an image is formed by the above-mentioned process in a recording medium. Therefore, an image of high quality with high O.D. (reflective optical density) and reduced bleeding is obtained.

Hereinafter, an example of a method of determining that the water-soluble organic solvent undergoes completely or substantially no salvation with the colorant, the ionic groups of the colorant are not dissociated at all or substantially with respect to the water-soluble organic solvent, and the colorant is not dispersed substantially with respect to the water-soluble organic solvent, will be described.

First, a colorant is prepared in a state where ionic groups of a pigment with at least one ionic group bonded to the surface directly or via another atomic group are not dissociated. In the process of producing the colorant, those which meet the above conditions are used, if any. In the case of a colorant dispersion liquid or ink where the colorant is dispersed due to ion dissociation, components other than the colorant, such as a medium, are removed by washing, evaporation, or the like, whereby a solid-state colorant in which ionic groups are not dissociated is produced. Specifically, ultrafiltration, centrifugation, drying in reduced pressure and high temperature environment, and the like are effective. The obtained colorant is desirably pulverized to powder with a mortar.

Next, the pulverized substance of the colorant obtained as described above is added to various kinds of water-soluble organic solvents in a concentration of 0.05% by mass, followed by stirring for about one hour. At this time, there are combinations of the colorant and the water-soluble organic solvent in which clear liquid-solid phase separation can be visually confirmed. Those combinations in which liquid-solid phase separation occurs can be determined as follows: the water-soluble organic solvent undergoes completely or substantially no salvation with respect to the colorant, and the ionic groups of the colorant are not dissociated at all or substantially with the water-soluble organic solvent, and the colorant is not dispersed substantially in the water-soluble organic solvent.

Furthermore, in order to make exact determination, the following is performed. In order to precipitate the colorant that is not dispersed substantially in the water-soluble organic solvent to some extent, a mixture of the above colorant and water-soluble organic solvent is allowed to stand still. An example of the condition for allowing the mixture to stand still at this time is, although depending upon the viscosity of the solvent or the like, about 100 hours at room temperature for reference. Thereafter, 50% by mass of the upper portion of the liquid phase is gently collected, and the collected liquid phase is filtered for the purpose of removing floating coarse particles. The pore size used for filtration depends upon the particle size of the colorant but may be about 10 times the average particle size in an aqueous dispersion liquid for reference. Thereafter, the colorant concentration in the obtained filtrate (colorant solvent dispersion liquid) is measured.

An example of a method of measuring a colorant concentration includes measurement with absorbance. Specifically, measurement is performed as follows. A predetermined amount of pure water is added to an aqueous dispersion liquid of a colorant in which a colorant with a known concentration ($Ck$ % by mass) is dispersed in water to dilute the dispersion liquid at a predetermined dilution ratio, and the absorbance at 550 nm is measured. This measurement value of absorbance is defined as ($ABS1$). Then, the colorant solvent dispersion liquid whose concentration is desired to be obtained is diluted with pure water at the same dilution ratio as the above, and the absorbance at 550 nm is measured similarly. This measurement value of absorbance is defined as ($ABS2$). Consequently, the colorant concentration in the colorant solvent dispersion liquid is calculated by the following expression.

$$\text{Colorant concentration of colorant solvent dispersion liquid (\%)} = Ck \times (ABS2)/(ABS1)$$

By using the ratio between the colorant concentration in the colorant solvent dispersion liquid obtained as described above and the initial colorant concentration (initially set concentration, which is 0.05% in the above example) in the mixture of the colorant and the water-soluble organic solvent, the colorant solvent dispersion ratio (%) is defined as follows:

$$\text{Colorant solvent dispersion ratio (\%)} = \text{(Colorant concentration of colorant solvent dispersion liquid)}/\text{(Initial colorant concentration)} \times 100$$

Regarding the colorant solvent dispersion liquid with a very small colorant solvent dispersion ratio for example, 16 or lower, preferably 10 or lower, and further preferably 5 or lower, it is determined that the colorant is not substantially dispersed in the water-soluble organic solvent, the water-soluble organic solvent undergoes completely or substantially no salvation with the colorant, and ionic groups of the colorant are not dissociated at all or substantially with respect to the water-soluble organic solvent.

An example of a method of determining that a colorant undergoes completely or substantially no solvation with a water-soluble organic solvent, and a method of determining that ionic groups of a colorant are not dissociated at all or substantially with respect to a water-soluble organic solvent, which can be used in addition to the above-mentioned determination method, will be described.

First, an example of a method of determining that a colorant undergoes completely or substantially no solvation with a water-soluble organic solvent will be described. This can be determined by measuring how far a surfactant adsorbs to a colorant. As described above, the degree of solvation depends upon how far a colorant has a site with affinity for a medium such as a water-soluble organic solvent, and the amount and size of the above site assumed to correlate with the adsorption amount of the surfactant.

That is, in the colorant that substantially undergoes solvation with a medium such as a water-soluble organic solvent, the above-mentioned site with affinity is large in amount or in size, and the adsorption amount of the surfactant is also large. In contrast, in the colorant that undergoes completely or substantially no solvation with a medium such as a water-soluble organic solvent, the above-mentioned site with affinity is small in amount or in size, and the adsorption amount of the surfactant is very small.

The surfactant has the characteristics in which the surface tension of liquid is remarkably changed depending upon the concentration. Therefore, as one index for estimating how far the surfactant adsorbs to a colorant, measurement of the surface tension is regarded as effective. For example, when the surface tension of an aqueous solution containing a surfactant in a predetermined concentration is compared with the surface tension of liquid composed of a surfactant in a predetermined concentration, a colorant in a predetermined concentration, and water, in the case where the colorant hardly adsorbs the surfactant, an effective concentration of the surfactant contributing to the decrease in the surface tension is substantially the same in both the liquids, so that the surface tensions of the liquids are also substantially equal to each other. In contrast, in the case where the adsorption amount of the surfactant with respect to the colorant is large, the effective concentration of the surfactant is decreased in a liquid containing a colorant, so that the decrease degree of the surface tension becomes smaller than that of the surfactant aqueous solution containing no colorant. That is, as long as the colorant has no effect of remarkably decreasing the surface tension of liquid, it is possible to estimate how far the colorant adsorbs the surfactant from the difference between the surface tension of an aqueous solution containing a surfactant in a predetermined concentration and the surface tension of liquid composed of a surfactant in the same concentration, a colorant in a predetermined concentration, and water.

Specifically, first, a liquid [liquid 1] composed of a surfactant and water and having a surfactant concentration of 2 mmol/kg, and a liquid [liquid 2] composed of the surfactant, a colorant and water, having a surfactant concentration of 2 mmol/kg and having a colorant concentration of 5% by mass, are prepared. Then, the surface tensions of those liquids are measured to make a determination as follows. There is no particular limitation to the surfactant, as long as it remarkably changes the surface tension of liquid depending upon its concentration. The liquid [liquid 1] preferably has a surface tension of 50 mN/m or less. Examples of the surfactant to be used preferably include those which have structures represented by Structural Formulae (1) and (2) below.

Structural Formula (1):

(In Structural Formula (1) above, R represents an alkyl group, and n represents an integer.)

Structural Formula (2):

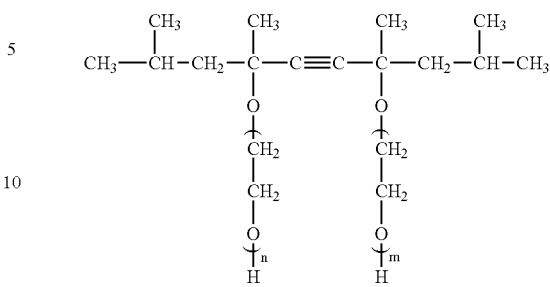

(In Structural Formula (2) above, m and n each represent an integer.)

In the case of collecting a colorant from ink, when producing the above-mentioned liquid [liquid 2], it is preferable to remove components other than the colorant as much as possible by ultrafiltration, centrifugation, drying in reduced pressure and high temperature environment, or the like. If the components other than the colorant, such as a solvent, a surfactant, an additive, and the like in ink remain in a large amount in ink, there is a possibility that the surface tension of liquid is changed by those components, and the adsorption degree of the surfactant with respect to the colorant is changed. Consequently, correct determination results may not be obtained. It is preferable that the surface tension of the liquid composed of the colorant collected from the ink and water and having a colorant concentration of 5% by mass is preferably 65 mN/m or more.

The liquids [liquid 1 and liquid 2] prepared as described above are stirred thoroughly, and thereafter, the respective surface tensions are measured. Assuming that the surface tension of [liquid 1] is A (mN/m), and the surface tension of [liquid 2] is B (mN/m), when the relationship of B-A $\leq$10, preferably B-A$\leq$5 is satisfied, it is determined that the surfactant does not adsorb at all or substantially to the colorant, and such a colorant is determined to be the one that undergoes completely or substantially no solvation even with a medium such as a water-soluble organic-solvent.

Next, an example of a method of determining that ionic groups of a colorant are not dissociated at all or substantially with respect to a water-soluble organic solvent will be described. For example, such a determination can be performed by observing the electrophoresis of particles. In the case where ionic groups of a colorant are dissociated in a water-soluble organic solvent, the colorant is charged. Therefore, in an electric field, the colorant moves in a particular direction in accordance with its polarity (so-called electrophoresis occurs). In other words, a colorant that does not move at all or substantially in a particular direction in an electric field irrespective of having ionic groups (i.e., a colorant that does not effect electrophoresis at all or substantially) is not charged at all or substantially in the water-soluble organic solvent. That is, it is considered that ionic groups of a colorant are not dissociated at all or substantially.

Specifically, first, a colorant or an ink containing a colorant is diluted with various kinds of water-soluble organic solvents. In the case of using the ink containing a colorant, components other than the colorant such as water and a medium are also contained in diluted liquid. However, the ink is diluted to a very low concentration, so that the influence of those components is substantially negligible, and the interaction between the water-soluble organic solvent and the colorant present in excess is considered to be predominant.

Regarding the diluted liquid, in the case where it is determined that particles do not move at all or substantially in a particular direction under application of a voltage, and the particles do not effect electrophoresis at all or substantially, using an apparatus capable of observing the actual movement of particles (e.g., microscope-type zeta potential meter (trade name: ZEECOM, manufactured by Microtec Nition Co., Ltd.), it is determined that ionic groups of the colorant are not dissociated at all or substantially with respect to the water-soluble organic solvent.

In the case of forming an image in which a black site and a color site are formed in a mixed form on plain paper, if the aqueous ink of the present invention is used as a black ink, the aggregation or dispersion destruction of a colorant constituting the black ink on the paper surface is considered to proceed relatively rapidly compared with other ink, as described above.

According to the image forming method of the present invention, the aqueous ink of the present invention is used as a black ink, and image formation with a color ink is performed after image formation with the black ink (more preferably, a scan for applying a color ink is performed at least one scan after a scan for applying a black ink is performed). Thus, even if the black ink is brought into contact with the color ink, color mixture between the black ink and the color ink do not occur on the paper surface, and image formation excellent in resistance to bleeding can be performed.

More specifically, only by just performing image formation with a black ink and image formation with a color ink with a time interval between the colors, the above-mentioned excellent effects can be obtained without requiring a multi-path printing method that takes a long printing time in which printing is completed by performing scanning a plurality of times, and a method involving large equipment in which recovery systems are provided separately for a black ink and a color ink.

The aqueous ink according to the present invention has a feature that the above-mentioned particular relationship is established between the water-soluble organic solvent in an ink component and the colorant to be used. Otherwise, the same configuration as that of conventional aqueous ink can be used. Hereinafter, each component constituting the ink of the present invention will be described. First, the water-soluble organic solvent will be described.

(Aqueous Medium)

The aqueous ink of the present invention contains a mixed solvent of water and a water-soluble organic solvent as an aqueous medium. Applicable are water-soluble organic solvents which undergo completely or substantially no solvation with pigment particles with at least one ionic group bonded to the surface directly or via another atomic group, the ionic groups of the pigment not being dissociated at all or substantially. There is no particular limitation to the water-soluble organic solvent, as long as it is generally used as a water-soluble organic solvent for aqueous ink and satisfies the above conditions as determined by the above-mentioned method. The water-soluble organic solvent can be used alone or in combination of at least two kinds. In this case, it is necessary that all the water-soluble organic solvents to be used satisfy the above conditions. Examples of the organic solvents include PEG (polyethylene glycol) 200, PEG 400, PEG 600, 1,5-pentanediol, 1,4-pentanediol, 1,2,6-hexanetriol and 2-pyrollidone. Of these, PEG 600, 1,5-pentanediol and 2-pyrollidone are preferred, in which PEG 600 and 1,5-pentanediol are further preferred.

For the present invention, the content of the water-soluble organic solvent to the total mass of the ink is preferably 1 to 50%, more preferably 5 to 30%. Furthermore in an aqueous ink form in which the total content of the water-soluble organic solvent is at least twice as large as a colorant content in a mass ratio, the effects of the present invention can be exerted more remarkably.

As water, deionized water is preferably used. The amount of water in ink is preferably in a range of 50 to 95% by mass with respect to the total mass of the ink.

(Colorant)

The colorant constituting the aqueous ink of the present invention will be described. As the colorant in the aqueous ink of the present invention, a pigment with at least one ionic group bonded to the particle surface directly or via another atomic group is used. As long as this condition is satisfied, there is no particular limitation to the colorant. Pigments with a compound having an ionic group bonded to the surface by diazo-coupling, pigments with an ionic group introduced to the surface by surface oxidation with sodium hypochlorite or aqueous ozone treatment, etc., pigments to which a dispersant having an ionic group, a surfactant, a resin dispersant, or the like adsorbs, and the like can be used. Those colorants can be used alone or in combination of at least two kinds.

Above all, pigments with at least one ionic group selected from the group consisting of —COOM1, —SO$_3$M1 and —PO$_3$H(M1)$_2$ (where M1 represents a hydrogen atom, alkali metal, ammonium, or organic ammonium) chemically bonded to the surface directly or via another atomic group can be preferably used. Furthermore, pigments in which the above-mentioned atomic group is an alkylene group having 1 to 12 carbon atoms, a substituted or unsubstituted phenylene group, a substituted or unsubstituted naphthylene group, or the like can be used preferably. Such pigments are described, for example, in WO 97/47699. However, the detailed relationship between the pigment and the water-soluble organic solvent is not described therein. In the pigments with —COOM1 chemically bonded to the surface directly or via another atomic group among the above ionic groups, water resistance is relatively improved, so that the pigments can be used more preferably.

More specifically, pigments with a —C$_6$H$_4$—COOM1 group, or a —C$_6$H$_3$—(COOM1)$_2$ group (where M1 represents a hydrogen atom, alkali metal, ammonium, or organic ammonium) introduced to the pigment surface can be preferably used. Above all, those in which a —C$_6$H$_3$—(COOM1)$_2$ group is introduced, exert preferable effects in the configuration of the present invention.

Regarding the amount of the above-mentioned —C$_6$H$_4$—COOM1 group, or —C$_6$H$_3$—(COOM1)$_2$ group introduced to the pigment surface, as the amount per unit surface area of pigment particles is larger, more preferable effects can be exerted in the configuration of the present invention. This is supposedly because the degree of solvation of the water-soluble organic solvent with respect to the pigment is reduced due to steric hindrance or the like along with an increase in ionic groups.

(Pigment Particle)

The pigment particles that can be used in the aqueous ink of the present invention are not particularly limited and any of the following ones may be used. Those of carbon black however are preferred.

Carbon Black is suitable as the pigment used in the black ink. For example, Carbon Black such as Furnace Black, Lamp Black, Acetylene Black or Channel Black can be used. Specific examples of commercially available products that can be used include: Raven 7000, Raven 5750, Raven 5250, Raven 5000 ULTRA, Raven 3500, Raven 2000, Raven 1500, Raven 1250, Raven 1200, Raven 1190 ULTRA-II, Raven 1170, and Raven 1255 (all manufactured by Columbian Chemicals Co.); Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, Monarch 2000, and Vulcan XC-72R (all manufactured by Cabot Corporation); Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (all manufactured by Degussa Corporation); and No. 25, No. 33, No. 40, No. 47, No. 52, No. 900, No. 2300, MCF-88, MA600, MA7, MA8, and MA100 (all manufactured by Mitsubishi Chemical Corporation). Further, Carbon Black newly and separately prepared for the present invention may be also used. The present invention is not limited to the above and any conventionally known Carbon Black may be used. Further, the black pigment is not limited to Carbon Black and magnetic fine particles such as magnetite and ferrite may also be used.

Various types of organic pigment particles may be used as the pigment particle for the ink other than the black ink. Specific examples of the organic pigment particles include: insoluble azo pigments such as Toluidine Red, Toluidine Maroon, Hansa Yellow, Benzidine Yellow, and Pyrazolone Red; soluble azo pigments such as Lithol Red, Helio Bordeaux, Pigment Scarlet, and Permanent Red 2B; derivatives of vat dyes such as alizarine, indanthrone and Thioindigo Maroon; phthalocyanine pigments such as Phthalocyanine Blue and Phthalocyanine Green; quinacridone pigments such as Quinacridone Red and Quinacridone Magenta; perylene pigments such as Perylene Red and Perylene Scarlet; isoindolinone pigments such as Isoindolinone Yellow and Isoindolinone Orange; imidazolone pigments such as Benzimidazolone Yellow, Benzimidazolone Orange, and Benzimidazolone Red; pyranthrone pigments such as Pyranthrone Red and Pyranthrone Orange; indigo pigments; condensed azo pigments; thioindigo pigments; diketopyrrolopyrrole pigments; Flavanthrone Yellow, Acylamide Yellow, Quinophthalone Yellow, Nickel Azo Yellow, Copper Azo Methine Yellow, Perinone Orange, Anthrone Orange, Dianthraquinonyl Red, and Dioxazine Violet. Of course, the organic pigments are not particularly limited to those and may also be other organic pigments.

Further, examples of the organic pigments (represented by Color Index (C.I.) numbers) used in the present invention include: C.I. Pigment Yellow 12, 13, 14, 17, 20, 24, 74, 83, 86, 93, 97, 109, 110, 117, 120, 125, 128, 137, 138, 147, 148, 150, 151, 153, 154, 166, 168, 180, and 185; C.I. Pigment Orange 16, 36, 43, 51, 55, 59, 61, and 71; C.I. Pigment Red 9, 48, 49, 52, 53, 57, 97, 122, 123, 149, 168, 175, 176, 177, 180, 192, 215, 216, 217, 220, 223, 224, 226, 227, 228, 238, 240, 254, 255, and 272; C.I. Pigment Violet 19, 23, 29, 30, 37, 40, and 50; C.I. Pigment Blue 15, 15:1, 15:3, 15:4, 15:6, 22, 60, and 64; C.I. Pigment Green 7 and 36; and C.I. Pigment Brown 23, 25, and 26.

For the present invention, the content of the colorant to the total mass of the ink is preferably 0.1 to 15%, particularly preferably 1 to 10%.

The aqueous ink of the present invention may contain, as an ink component, a moisture-retentive component such as urea, a urea derivative, trimethylolpropane, or trimethylolethane in addition to the above-mentioned components for the purpose of retaining moisture. In general, the content of the moisture-retentive component is preferably in a range of 0.1 to 20.0% by mass, more preferably 3.0 to 10.0% by mass with respect to ink.

Furthermore, the ink of the present invention may contain various additives such as a surfactant, a pH regulator, a rust-preventive agent, a preservative, a fungicide, an antioxidant, a reduction preventive, an evaporation accelerator, and a chelating agent, if required, in addition to the above-mentioned components. Furthermore, by adding a polymer and the like if required, resistance to rubbing and resistance to highlighter pens can be enhanced. Above all, a nonionic polymer having no ionic group has less effect on the reliability of ink, so that it can be used preferably.

(Color Ink)

A feature of the image forming method of the present invention is as follows. In an ink-jet recording method of performing recording on plain paper with a black ink and at least one aqueous color ink, the aqueous ink of the present invention having a configuration as described above is used as the black ink. When an image is formed in such a manner that an image formed with the black ink and an image formed with the color ink are adjacent to each other, after an image is formed by performing a scan for applying a black ink, a scan for applying a color ink to an area where the image is formed is performed.

Hereinafter, the color ink in the case where the ink of the present invention is used only for the black ink will be described. According to the image forming method of the present invention, any conventionally known aqueous color ink for ink-jet recording can be used. An example of the colorant for the color ink includes a water-soluble dye. In particular, a water-soluble dye having an anionic group as a solubilizing group is preferably used. The color of the color ink used in the present invention can be appropriately selected from, for example, cyan, magenta, yellow, red, green, blue, and orange.

There is no particular limitation to the water-soluble dye having an anionic group used in the present invention, as long as it is an acidic dye, a direct dye, or a reactive dye described in COLOUR INDEX. Furthermore, there is no particular limitation to dyes that are not described in COLOUR INDEX, as long as they have an anionic group (e.g., a sulfone group). Those dyes are used in a range of 1 to 10% by mass, preferably 1 to 5% by mass in ink.

The following may be given as specific examples of dyes.

C.I. Direct Yellow 8, 11, 12, 27, 28, 33, 39, 44, 50, 58, 85, 86, 87, 88, 98, 100, and 110.

C.I. Direct Red 2, 4, 9, 11, 20, 23, 24, 31, 39, 46, 62, 75, 79, 80, 83, 89, 95, 197, 201, 218, 220, 224, 225, 226, 227, 228, and 230.

C.I. Direct Blue 1, 15, 22, 25, 41, 76, 77, 80, 86, 90, 98, 106, 108, 120, 158, 163, 168, 199, and 226.

C.I. Acid Yellow 1, 3, 7, 11, 17, 23, 25, 29, 36, 38, 40, 42, 44, 76, 98, and 99.

C.I. Acid Red 6, 8, 9, 13, 14, 18, 26, 27, 32, 35, 42, 51, 52, 80, 83, 87, 89, 92, 94, 106, 114, 115, 133, 134, 145, 158, 198, 249, 265, and 289.

C.I. Acid Blue 1, 7, 9, 15, 22, 23, 25, 29, 40, 43, 59, 62, 74, 78, 80, 90, 100, 102, 104, 117, 127, 138, 158, and 161.

Examples of the colorant for the color ink that can be used in the present invention in addition to the above include the following (1 to 3). Most of these colorants exhibit excellent water resistance when applied to a recording medium, so that they are preferable.
1. Dyes having a carboxyl group as a solubilizing group
2. Oil-soluble dyes
3. Pigments There is no particular limitation to the oil-soluble dye, as long as it is described in COLOUR INDEX. Furthermore, there is no particular limitation to even new dyes that are not described in COLOUR INDEX. Specific examples thereof are as follows. These dyes are used preferably in a range of 1 to 10% by mass, more preferably 1 to 5% by mass in ink.

C.I. Solvent Blue 33, 38, 42, 45, 53, 65, 67, 70, 104, 114, 115, and 135.

C.I. Solvent Red 25, 31, 86, 92, 97, 118, 132, 160, 186, 187, and 219.

C.I. Solvent Yellow 1, 49, 62, 74, 79, 82, 83, 89, 90, 120, 121, 151, 153, and 154.

In the case where a pigment is used as the colorant for the color ink used in the present invention, the amount of the pigment is in a range of 1 to 20% by mass, preferably 2 to 12% by mass with respect to the total mass of ink. Examples of a color organic pigment that can be used in the present invention include, but are not limited to, the following. Furthermore, in addition to the above, it is needless to say that pigments newly produced for the present invention can also be used.

C.I. Pigment Yellow 1, 2, 3, 13, 16, 74, 83, and 128.

C.I. Pigment Red 5, 7, 12, 48 (Ca), 48 (Mn), 57 (Ca), 112, and 122.

C.I. Pigment Blue 1, 2, 3, 15:3, 16, 22, C.I. Vat Blue 4, and 6.

Furthermore, in the case of using a pigment, any water-soluble resin can be used as a dispersant for dispersing the pigment in ink. The dispersant has a weight average molecular weight preferably in a range of 1,000 to 30,000, more preferably 3,000 to 15,000. Specific examples of the dispersant include a block copolymer, a random copolymer, or a graft copolymer composed of at least two monomers (at least one of them is a hydrophilic monomer) selected from styrene, a styrene derivative, vinylnaphthalene, a vinylnaphthalene derivative, an aliphatic alcohol ester of $\alpha,\beta$-ethylenically unsaturated carboxylic acid, acrylic acid, an acrylic acid derivative, maleic acid, a maleic acid derivative, itaconic acid, an itaconic acid derivative, fumaric acid, a fumaric acid derivative, vinyl acetate, vinyl pyrrolidone, acrylamide, and a derivative thereof, or salts thereof. Alternatively, a natural resin such as rosin, shellac, or starch can also be used preferably. Those resins are soluble in an aqueous solution in which a base is dissolved, and also soluble in alkali. It is preferable that those water-soluble resins used as the pigment dispersant be contained in a range of 0.1 to 5% by mass with respect to the total mass of ink.

A suitable aqueous medium for use in the color ink of the present invention is water or a mixed medium containing water and a water-soluble organic solvent. The water preferably used is not normal water that contains various ions, but ion-exchanged water (deionized water). Examples of the water-soluble organic solvent used by mixing with water include: alkyl alcohols having 1 to 4 carbon atoms such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or keto alcohols such as acetone and diacetone alcohol; ethers such as tetrahydrofuran and dioxane; polyalkylene glycols such as polyethylene glycol and polypropylene glycol; alkylene glycols with an alkylene group having 2 to 6 carbon atoms such as ethylene glycol, propylene glycol, butylene glycol, triethylene glycol, 1,2,6-hexanetriol, thiodiglycol, hexylene glycol, and diethylene glycol; glycerin; lower alkyl ethers of polyhydric alcohols such as ethyleneglycol monomethyl (or ethyl) ether, diethyleneglycol methyl (or ethyl) ether, and triethyleneglycol monomethyl (or ethyl) ether; N-methyl-2-pyrrolidone, 2-pyrrolidone, and 1,3-dimethyl-2-imidazolidinone. Of the various water-soluble organic solvents, polyhydric alcohols such as diethyleneglycol and lower alkyl ethers of polyhydric alcohols such as triethyleneglycol monomethyl (or ethyl) ethers are preferable.

The content of the above-mentioned water-soluble organic solvent in color ink is generally in a range of 3 to 50% by mass, preferably 3 to 40% by mass with respect to the total mass of ink. Furthermore, the content of water to be used is in a range of 10 to 90% by mass, preferably 30 to 80% by mass with respect to the total mass of ink. Furthermore, a surfactant, an antifoaming agent, a preservative, and the like can be added appropriately to the color ink used in the present invention in addition to the above components so as to provide a desired physical value if required.

It is preferable that the black ink and the color ink used in the present invention and composed of the above-described components have the satisfactory ejection property from an ink-jet recording head. Therefore, in terms of an ejection property from the ink-jet recording head, it is preferable that the characteristics of the ink be, for example, as follows: the viscosity thereof is 1 to 15 mPa.s, and the surface tension thereof is 25 mN/m or more. More preferably, the viscosity is 1 to 5 mPa.s, and the surface tension is 25 to 50 mN/m. Furthermore, in the case of using the black ink together with the color ink, it is more preferable that the surface tension of the color ink be lower than that of the black ink. Specifically, the surface tension of the black ink is 35 to 50 mN/m, and that of the color ink is 25 to 35 mN/m.

(Image Forming Method)

Hereinafter, the image forming method of the present invention will be described. A feature of the method is as follows. The image forming method of the present invention is an ink-jet recording method in which recording is performed on plain paper with a black ink and at least one aqueous color ink. As the black ink, the aqueous ink of the present invention as described above is used. When an image is formed so that an image formed with the black ink and an image formed with the color ink are adjacent to each other, after an image is formed by performing a scan for applying the black ink, a scan for applying the color ink in an area where the image is formed is performed.

Figure 8:
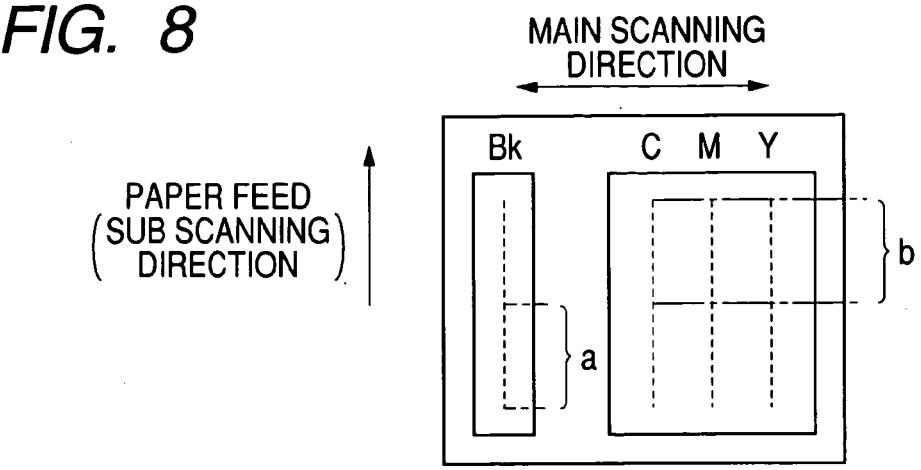
FIG. 8 is a view showing an example of a recording head used in the present invention.

FIG. 8 shows an example of a recording head used for carrying out the image forming method of the present invention. As shown in FIG. 8, the recording head includes an ejection orifice line (Bk) for ejecting black ink, and an ejection orifice line for ejecting ink of three colors (cyan (C), magenta (M), and yellow (Y)).

According to the image forming method of the present invention, in the case of forming a color image, it is preferable to use a recording head in which the black ink ejection orifice line for ejecting a black ink and the color ink ejection orifice line are placed so as to be mutually shifted in a sub-scanning direction. Therefore, for example, when an image is formed using the recording head shown in FIG. 8, it is preferable to perform the following. In the case of forming an image with only a black ink, the entire black ink ejection orifice line is used. In the case of forming a color image in which a black image and a color image are mixed, a portion represented by "a" in FIG. 8 is used for the black ink, and a portion represented by "b" in FIG. 8 is used for a C, M, and Y inks. Hereinafter, the case of forming an image in which a black site and a color site are formed in a mixed form will be described in more detail with reference to FIG. 8.

In FIG. 8, first, by scanning a print head in a horizontal direction (main scanning direction) in the figure, using the portion "a" of the black ink ejection orifice line, black image data is recorded on a recording medium such as plain paper at one-path printing. Then, the recording medium is transported by a distance "a" in a vertical direction (sub-scanning direction) in the figure. In the subsequent process, a color image is formed using the portion "b" of the color ink ejection orifice line in the area where an image is formed with the portion "a" of the line for black ink in the same direction of the main scanning of the print head at one-path printing. At this time, the portion "a" of the black ink ejection orifice line is simultaneously used to form an image in a subsequent area. By repeating those processes, an image is being formed in which the black ink and the color ink are mixed.

Figure 9:
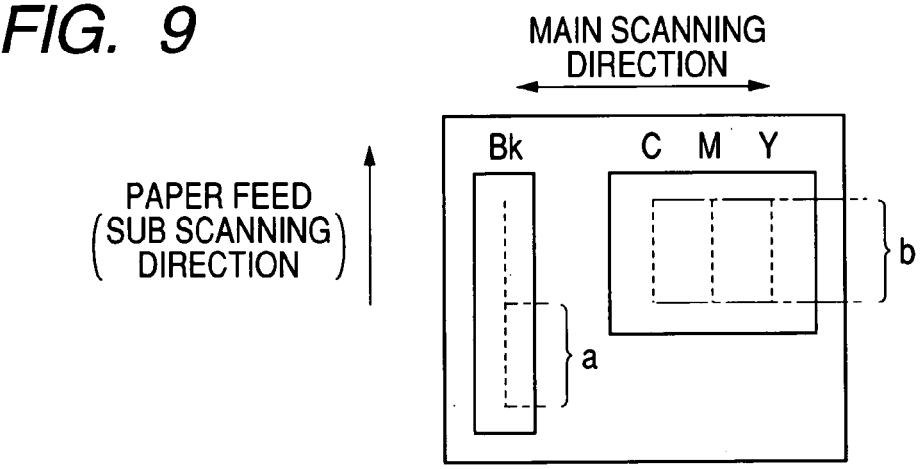
FIG. 9 is a view showing an example of a recording head used in the present invention.

FIG. 9 shows another example of a recording head that can be used for carrying out the image forming method of the present invention. In the same way as in FIG. 8, in FIG. 9, the portion represented by "a" in the figure of the ejection orifice line is used for a black ink, and the portion represented by "b" in the figure corresponding to the entire area of the ejection orifice line is used for a C, M, and Y inks. In the same way as described with reference to FIG. 8, an image is formed in which the black ink and the color ink are mixed.

Figure 10:
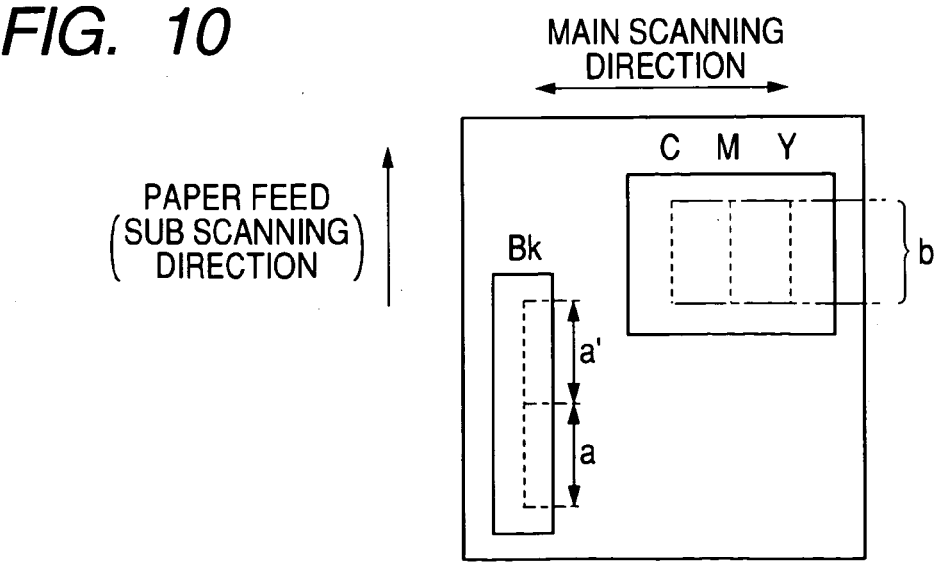
FIG. 10 is a view showing an example of a recording head used in the present invention.

FIG. 10 shows still another example of a recording head that can be used for carrying out the image forming method of the present invention. In the same way as in FIG. 8, even in FIG. 10, the portion represented by "a" in the figure of the ejection orifice line is used for a black ink, and the portion represented by "b" in the figure corresponding to the entire area of the color ink ejection orifice line is used for a C, M, and Y inks. Thus, an image is formed in which the black ink and the color ink are mixed. In the recording head illustrated in FIG. 10, as shown in the figure, a distance of one paper feed "a'" is set between the portion "a" of the black ink ejection orifice line and the portion "b" for color ink. Therefore, in the recording head with such a configuration, during a period from a time when a black image is formed to a time when a color image is formed in a same area, a time difference of one print scanning is further caused at each reciprocation. Thus, the recording head illustrated in FIG. 10 is more advantageous in terms of prevention of bleeding between the black ink and the color ink, compared with the configuration shown in FIG. 9.

Figure 11:
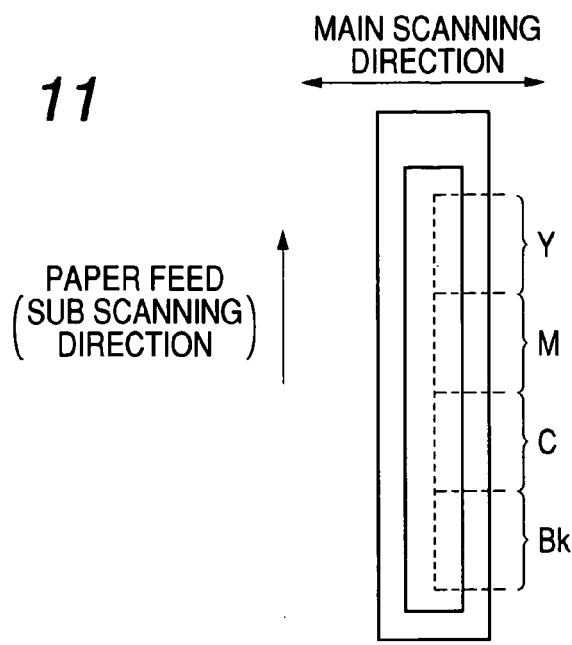
FIG. 11 is a view showing an example of a recording head used in the present invention.

FIG. 11 shows still another example of a recording head that can be used for carrying out the image forming method of the present invention. Even in the case of using a recording head in which ejection orifice lines for a black ink and a color ink are arranged in a row in the stated order in a paper feed direction, a color image is formed after a black image is formed in accordance with paper feed.

Figure 12:
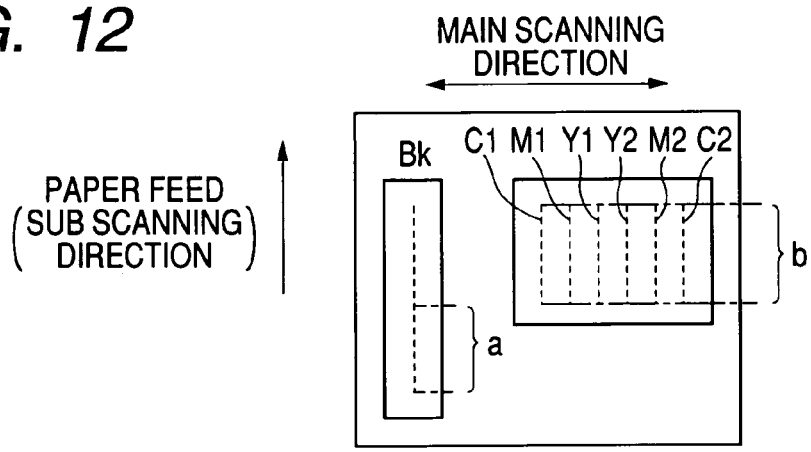
FIG. 12 is a view showing an example of a recording head used in the present invention.

FIG. 12 shows still another example of a recording head that can be used for carrying out the image forming method of the present invention. In the recording head shown in FIG. 12, the ejection orifice lines for a color ink are configured for cyan inks (C1, C2), magenta inks (M1, M2), and yellow inks (Y1, Y2) in two rows each symmetrically in the main scanning direction so that the injecting order of the color inks becomes equal between scanning in a forward direction and scanning in a backward direction. Consequently, even in formation of an image in which the black ink and the color ink are mixed, bi-directional printing is possible. In this case, first, a black image is formed in a forward direction of main scanning of the print head using the portion "a" for the black ink. Then, the recording medium is transported by the distance "a". Then, in the process in a backward direction of main scanning of the print head, a color image is formed by one-path printing in an area, where the image is formed by the portion "a" of the line for the black ink, using the portion "b" of the ejection orifice line for the color ink. At this time, with the portion "a" of the ejection orifice line for the black ink, a black image is being formed simultaneously in a subsequent area. By repeating those processes, an image in which the black ink and the color ink are mixed is being formed.

Figure 13:
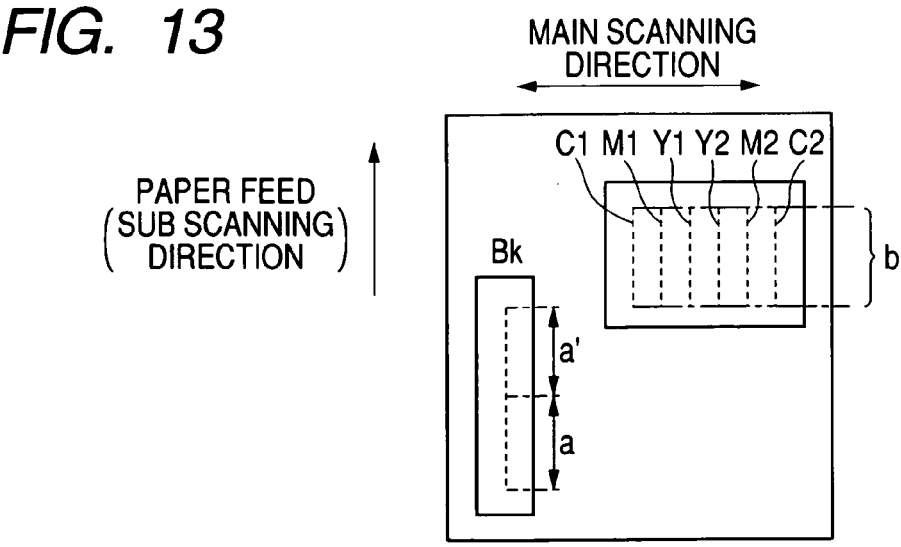
FIG. 13 is a view showing an example of a recording head used in the present invention.

Even in a head designed for the bi-directional printing as shown in FIG. 12, in the same way as the foregoing cases, a nozzle arrangement of a black ink and a color ink is used, and an interval of one scanning is set between the formation of a black image and the formation of a color image, whereby more advantageous configuration with respect to the prevention of bleeding may be attained (see FIG. 13). The image forming method of the present invention has been described so far. The form of a recording head to be used in the method of the present invention is not limited to those shown in FIGS. 8 to 13.

(Recording Method, Recording Unit, Cartridge, and Recording Apparatus)

Figure 1:
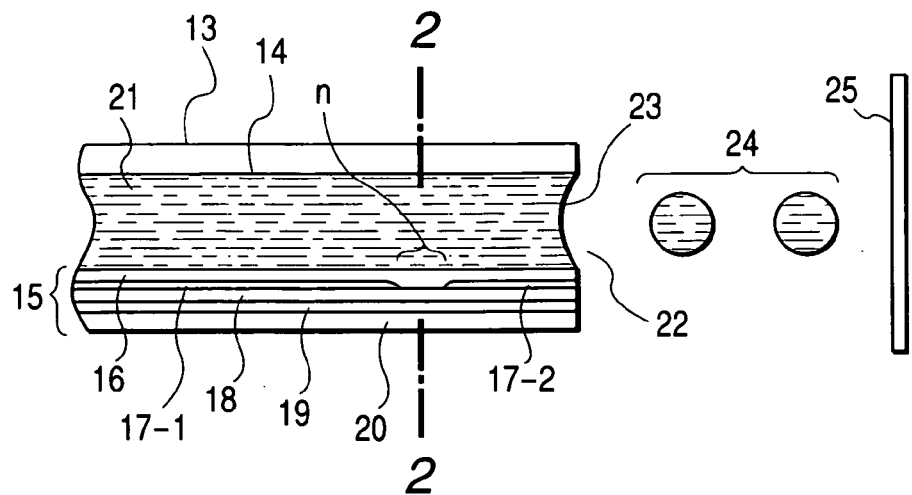
FIG. 1 is a cross-sectional view in a longitudinal direction of a head of an ink-jet recording apparatus.
Figure 2:
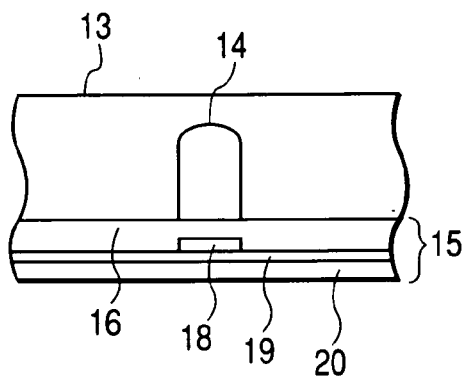
FIG. 2 is a side view in a longitudinal direction of the head of the ink-jet recording apparatus.

Next, an ink-jet recording apparatus of a preferred embodiment of the present invention will be described. First, an example of a head configuration that is a main component of an ink-jet recording apparatus using thermal energy is shown in FIGS. 1 and 2. FIG. 1 is a cross-sectional view of a head 13 along an ink flow path. FIG. 2 is a cross-sectional view taken along the line 2—2 of FIG. 1. The head 13 is obtained by attaching a heat generating element substrate 15 to a glass, ceramic, silicon, or plastic plate having a flow path (nozzle) 14 for allowing ink to flow therethrough.

The heat generating element substrate 15 includes a protective layer 16 formed of silicon oxide, silicon nitride, silicon carbide, or the like, electrodes 17-1 and 17-2 formed of aluminum, gold, an aluminum-copper alloy, or the like, a heat generating resistor layer 18 formed of a material with a high melting point such as $HfB_2$, TaN, or TaAl, a heat storage layer 19 formed of thermally oxidized silicon oxide, aluminum oxide, or the like, and a substrate 20 formed of a material having good heat release property such as silicon, aluminum, or aluminum nitride.

Figure 3:
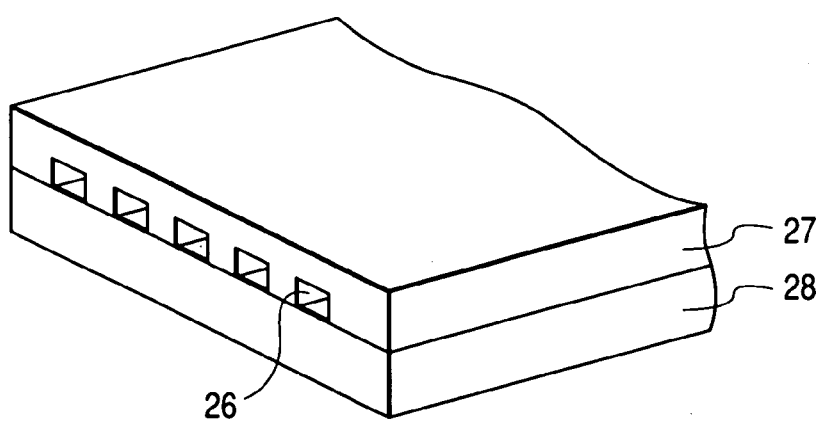
FIG. 3 is an external perspective view of a multi-head obtained from the head as shown in FIG. 1.

When a pulse-shaped electric signal is applied to the electrodes 17-1 and 17-2 of the head 13, an area represented by "n" of the heat generating element substrate 15 generates heat rapidly. Bubbles are generated in an ink 21 that is in contact with the surface of the area, and a meniscus 23 projects due to the pressure of the bubbles. Then, the ink 21 is ejected through the nozzle 14 of the head, and becomes ink droplets 24 through an ejection orifice 22. Then, the ink droplets 24 fly toward a recording medium 25. FIG. 3 is a view showing an external appearance of an example of a multi-head in which a number of heads shown in FIG. 1 are arranged. This multi-head is formed by attaching a glass plate 27 having a multi-nozzle 26 to a heat generating head 28 that is similar to that described in FIG. 1.

Figure 4:
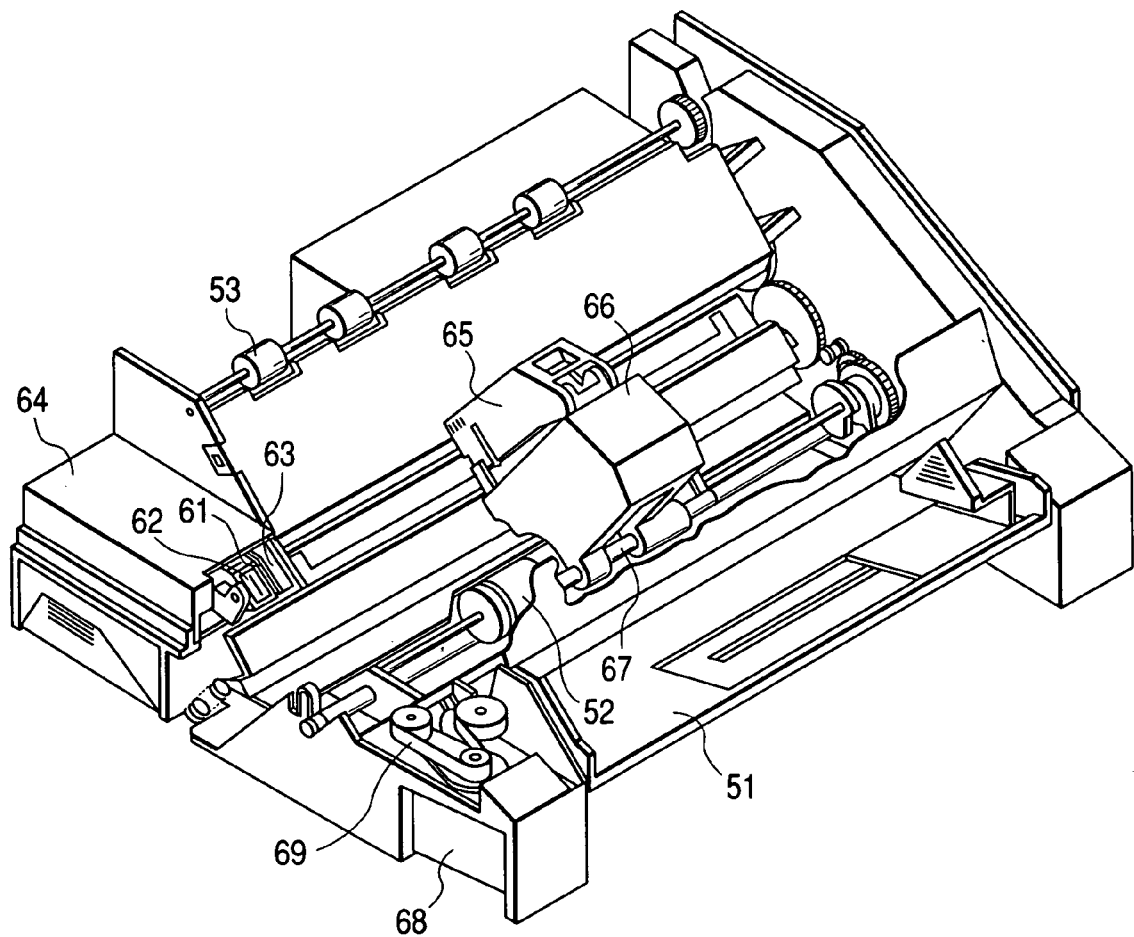
FIG. 4 is a perspective view showing an example of an ink-jet recording apparatus.

FIG. 4 shows an example of an ink-jet recording apparatus incorporating the head. In FIG. 4, reference numeral 61 denotes a blade as a wiping member. An end of the blade 61 is fixed while held by a blade holding member to form a cantilever. The blade 61 is placed at a position adjacent to a recording area by a recording head 65. In the case shown in the figure, the blade 61 is held in the form of projecting to the movement path of the recording head 65.

Reference numeral 62 denotes a cap of an ejection orifice surface of the recording head 65. The cap 62 is placed at a home position adjacent to the blade 61 and moves in a direction vertical to the movement direction of the recording head 65 to abut against the ink ejection orifice surface to perform capping. Furthermore, reference numeral 63 denotes an ink absorber provided adjacent to the blade 61. The ink absorber 63 is held so as to project to the movement path of the recording head 65 in the same way as in the blade 61. The blade 61, the cap 62, and the ink absorber 63 form an ejection recovering portion 64, and moisture, dust, and the like are removed from the ejection orifice surface by the blade 61 and the ink absorber 63.

Reference number 65 denotes a recording head that has an ejection energy generating unit and performs recording by ejecting ink to a recording medium opposed to the ejection orifice surface provided with an ejection orifice. Reference numeral 66 denotes a carriage for carrying the recording head 65 to move it. The carriage 66 is slidably engaged with a guide shaft 67, and a part of the carriage 66 is connected (not shown) to a belt 69 driven by a motor 68. With this arrangement, the carriage 66 can move along the guide shaft 67, and the recording head 65 can move through the recording area and an area adjacent thereto.

Reference numeral 51 denotes a paper feed portion for inserting a recording medium, and 52 denotes a paper feed roller driven with a motor (not shown). Due to these configurations, the recording medium is supplied to a position opposed to the ejection orifice surface of the recording head 65, and is delivered to a paper delivery portion provided with a delivery roller 53 as recording proceeds. When the recording head 65 returns to the home position after completing recording in the above configuration, the cap 62 of the ejection recovering portion 64 is retracted from the movement path of the recording head 65, whereas the blade 61 projects to the movement path. Consequently, the ejection orifice of the recording head 65 is wiped.

In the case where the cap 62 performs capping by abutting against the ejection surface of the recording head 65, the cap 62 moves so as to project to the movement path of the recording head 65. In the case where the recording head 65 moves from the home position to a recording start position, the cap 62 and the blade 61 are placed at the same position as that for wiping. Consequently, even in this movement, the ejection orifice surface of the recording head 65 is wiped. The above-mentioned movement of the recording head 65 to the home position does not occur only at the completion of recording or at a time of ejection recovery. The recording head moves to the home position adjacent to the recording area at a predetermined interval while moving through the recording area for recording, and the above wiping is performed along with this movement.

Figure 5:
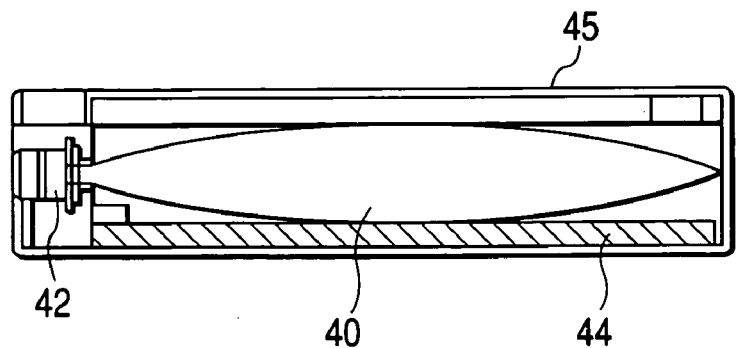
FIG. 5 is a cross-sectional view in a longitudinal direction of an ink cartridge.

FIG. 5 is a view showing an example of an ink cartridge containing ink supplied to a recording head via an ink supply member (e.g., a tube). In FIG. 5, reference numeral 40 denotes an ink-containing portion (e.g., an ink bag) containing a supply-ink, and a rubber plug 42 is provided at an end of the ink-containing portion 40. By inserting a needle (not shown) into the plug 42, ink in the ink bag 40 can be supplied to the recording head. Reference numeral 44 denotes an ink absorber for receiving waste ink. It is preferable that the surface of the ink-containing portion 40 in contact with the ink be made of polyolefin, in particular, polyethylene.

Figure 6:
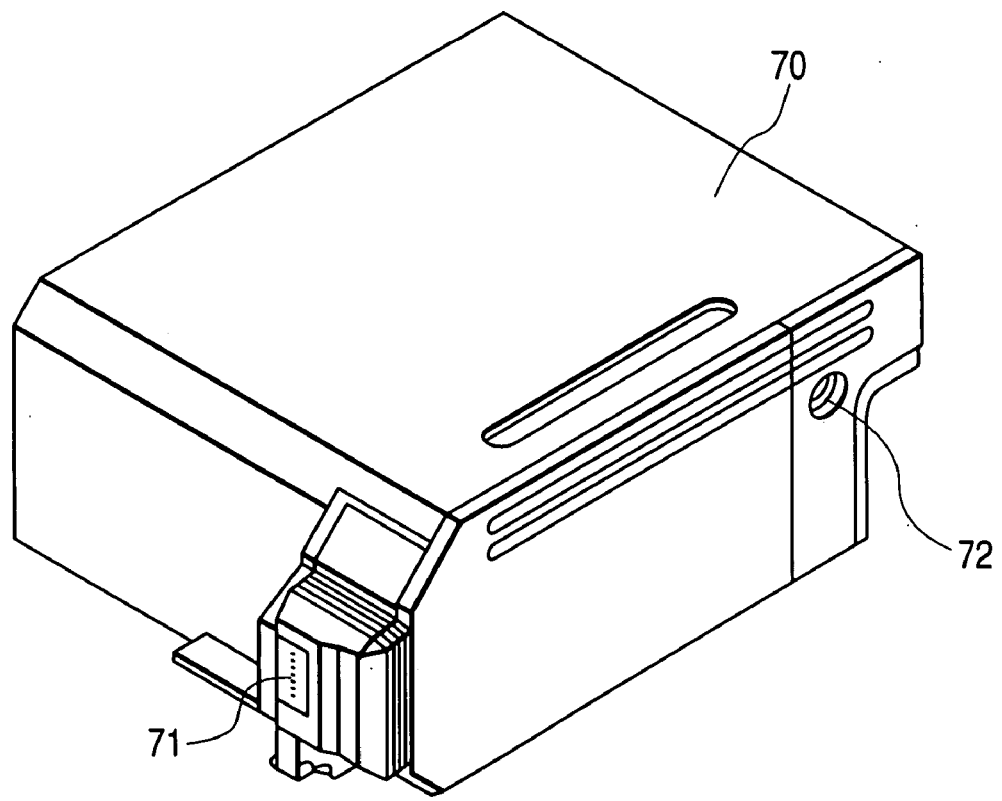
FIG. 6 is a perspective view showing an example of a recording unit.

The ink-jet recording apparatus used in the present invention is not limited to a configuration in which a head and an ink cartridge are separately provided, as described above. The ink-jet recording apparatus is also preferably used in a configuration in which the head and the ink cartridge are integrated, as shown in FIG. 6. In FIG. 6, reference numeral 70 denotes a recording unit. In the recording unit 70, an ink-containing portion containing ink (e.g., an ink absorber) is contained, and ink in the ink absorber is ejected from a head portion 71 having a plurality of orifices as ink droplets. As the material for the ink absorber, polyurethane is preferably used according to the present invention. Furthermore, instead of using the ink absorber, an ink bag in which an ink-containing portion includes a spring or the like may be used. Reference numeral 72 denotes an atmosphere communication port for allowing the inside of the cartridge to communicate with the atmosphere. The recording unit 70 is used in place of the recording head 65 shown in FIG. 4, and is detachably attachable to the carriage 66.

Figure 7:
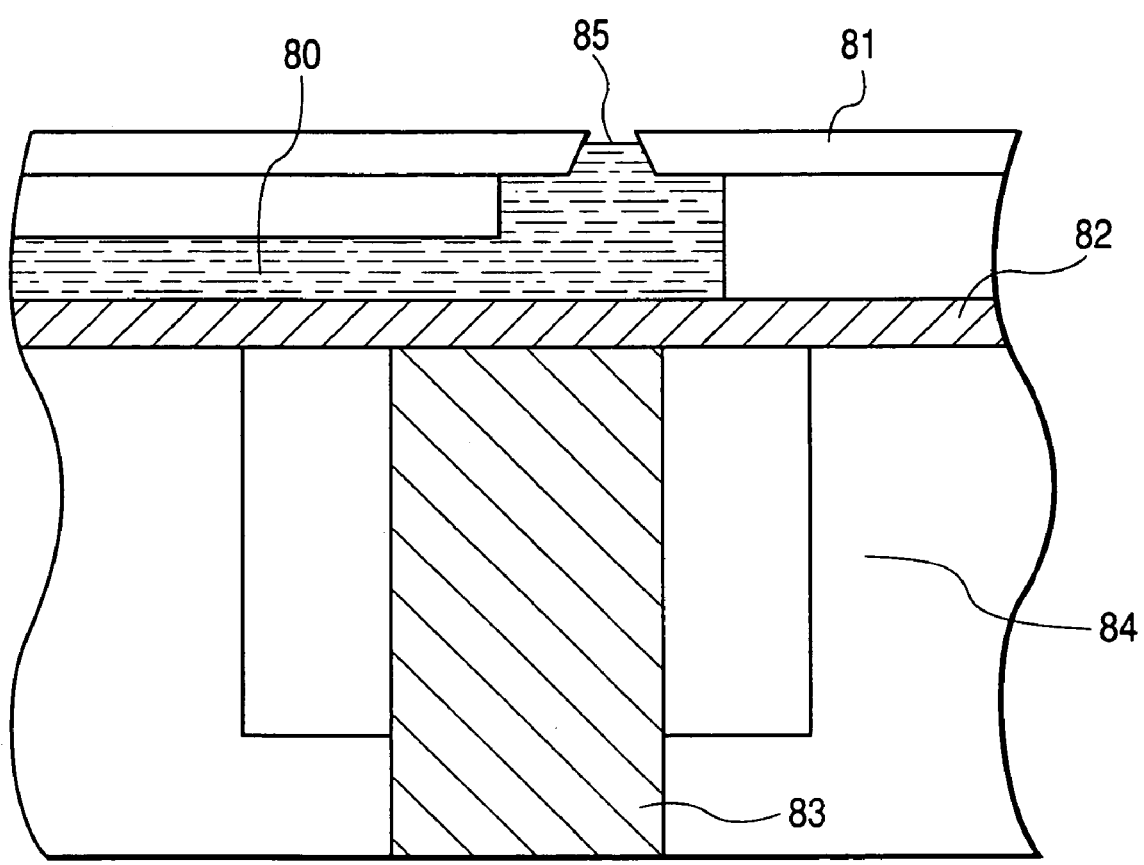
FIG. 7 is a view showing an example of a configuration of a recording head.

Next, a preferred embodiment of an ink-jet recording apparatus utilizing mechanical energy includes an on-demand ink-jet recording head. The on-demand ink-jet recording head includes a nozzle formation substrate having a plurality of nozzles, a pressure generating element made of a piezoelectric material and a conductive material placed opposite to the nozzles, and an ink filling the periphery of the pressure generating element. The pressure generating element is displaced by an applied voltage, whereby small liquid droplets of the ink are ejected from the nozzles. FIG. 7 shows an example of a configuration of a recording head that is a main portion of the recording apparatus.

The head includes an ink flow path 80 communicated with an ink chamber (not shown), an orifice plate 81 for ejecting ink droplets in a desired volume, a vibration plate 82 for applying pressure directly to ink, a piezoelectric element 83 that is connected to the vibration plate 82 and is displaced by an electric signal, and a substrate 84 for supporting in a place the orifice plate 81, the vibration plate 82, and the like.

In FIG. 7, the ink flow path 80 is made of a photosensitive resin or the like. The orifice plate 81 is provided with an ejection orifice 85 by drilling a metal such as stainless steel or nickel by electroforming or press working. The vibration plate 82 is made of a metal film (e.g., stainless steel, nickel, titanium, or the like), a highly-elastic resin film, or the like. The piezoelectric element 83 is formed of a dielectric material such as barium titanate, or PZT. The recording head with the above-mentioned configuration applies a pulse-shaped voltage to the piezoelectric element 83 to generate a strain stress, and its energy deforms the vibration plate 82 connected to the piezoelectric element 83. This presses ink in the ink flow path 80 vertically to allow ink droplets (not shown) to be ejected from the ejection orifice 85 of the orifice plate 81. Thus, recording is performed. Such a recording head is used while incorporated in the ink-jet recording apparatus similar to that shown in FIG. 4. The detailed operation of the ink-jet recording apparatus may be performed in a manner similar to the above.

EXAMPLES

Next, the present invention will be described more specifically by way of examples and comparative examples. However, the present invention is not limited to the following examples within the gist of the present invention. The terms "part" and "%" in the following description mean "part by mass" and "% by mass" unless otherwise stated.

(Preparation of Pigment Dispersion Liquid A)

First, 1.55 g of p-aminobenzoic acid was added to a solution of 5 g of concentrated hydrochloric acid in 5.5 g of water at 5° C. Then, a vessel containing the solution was placed in an ice bath, and the solution was stirred to keep the temperature of the solution at 10° C. or less. A solution of 1.8 g of sodium nitrite in 9 g of water at 5° C. was added to the above solution. After the resultant solution had been stirred for an additional 15 minutes, 6 g of carbon black having a specific surface area of 220 m$^2$/g and a DBP oil absorption of 105 ml/100 g was added to and mixed with the stirred solution. After that, the mixture was stirred for an additional 15 minutes. Then, the resultant slurry was filtered through Toyo Roshi No. 2 filter paper (manufactured by Advantis), and the remaining particles were thoroughly washed with water and dried in an oven at 110° C. to prepare a self-dispersible carbon black A. Furthermore, the self-dispersible carbon black A thus obtained was dispersed in water to a pigment concentration of 10% to thereby prepare a dispersion liquid. The above method provided a pigment dispersion liquid A with the self-dispersible carbon black A dispersed in water, the self-dispersible carbon black A being formed by introducing a —$C_6H_4$—COONa group to the carbon black particle surface.

The measured ionic group density of the self-dispersible carbon black A prepared as described above was 2.6 µmol/m$^2$. The method of measuring the ionic group density used at this time was as follows. The sodium ion concentration of the pigment dispersion liquid A prepared as described above was measured by using an ion meter (manufactured by DKK), and the concentration value was converted to the ionic group density of the self-dispersible carbon black A.

(Preparation of Pigment Dispersion Liquid B)

First, 1.5 g of 4-aminophthalic acid was added to a solution of 5 g of concentrated hydrochloric acid in 5.5 g of water at 5° C. Then, a vessel containing the solution was placed in an ice bath, and the solution was stirred to keep the temperature of the solution at 10° C. or less. A solution of 1.8 g of sodium nitrite in 9 g of water at 50° C. was added to the above solution. After the resultant solution had been stirred for an additional 15 minutes, 6 g of carbon black having a specific surface area of 220 m$^2$/g and a DBP oil absorption of 105 ml/100 g was added to and mixed with the stirred solution. After that, the mixture was stirred for an additional 15 minutes. Then, the resultant slurry was filtered through Toyo Roshi No. 2 filter paper (manufactured by Advantis), and the remaining particles were thoroughly washed with water and dried in an oven at 110° C. to prepare a self-dispersible carbon black B. Furthermore, the self-dispersible carbon black B thus obtained was dispersed in water to a pigment concentration of 10% to thereby prepare a dispersion liquid. The above method provided a pigment dispersion liquid B with the self-dispersible carbon black B dispersed in water, the self-dispersible carbon black B being formed by introducing a —$C_6H_3$—(COONa)$_2$ group to the carbon black particle surface.

The measured ionic group density of the self-dispersible carbon black B prepared as described above was 3.1 µmol/m$^2$. The method of measuring the ionic group density used at this time was the same as that used for the self-dispersible carbon black A.

(Preparation of Pigment Dispersion Liquid C)

First, 0.8 g of p-aminobenzoic acid was added to a solution of 2.5 g of concentrated hydrochloric acid in 5.5 g of water at 5° C. Then, a vessel containing the solution was placed in an ice bath, and the solution was stirred to keep the temperature of the solution at 10° C. or less. A solution of 0.9 g of sodium nitrite in 9 g of water at 5° C. was added to the above solution. After the resultant solution had been stirred for an additional 15 minutes, 9 g of carbon black having a specific surface area of 220 m2/g and a DBP oil absorption of 105 ml/100 g was added to and mixed with the stirred solution. After that, the mixture was stirred for an additional 15 minutes. Then, the resultant slurry was filtered through Toyo Roshi No. 2 filter paper (manufactured by Advantis), and the remaining particles were thoroughly washed with water and dried in an oven at 110° C. to prepare a self-dispersible carbon black C. Furthermore, the self-dispersible carbon black C thus obtained was dispersed in water to a pigment concentration of 10% to thereby prepare a dispersion liquid. The above method provided a pigment dispersion liquid C with the self-dispersible carbon black C dispersed in water, the self-dispersible carbon black C being formed by introducing a —$C_6H_4$—COONa group to the carbon black particle surface.

The measured ionic group density of the self-dispersible carbon black C prepared as described above was 1.0 µmol/m$^2$. The method of measuring the ionic group density used at this time was the same as that used for the self-dispersible carbon black A.

(Preparation of Pigment Dispersion Liquid D)

First, 0.7 g of 4-aminophthalic acid was added to a solution of 2.5 g of concentrated hydrochloric acid in 5.5 g of water at 5° C. Then, a vessel containing the solution was placed in an ice bath, and the solution was stirred to keep the temperature of the solution at 10° C. or less. A solution of 0.9 g of sodium nitrite in 9 g of water at 5° C. was added to the above solution. After the resultant solution had been stirred for an additional 15 minutes, 10 g of carbon black having a specific surface area of 220 m$^2$/g and a DBP oil absorption of 105 ml/100 g was added to and mixed with the stirred solution. After that, the mixture was stirred for an additional 15 minutes. Then, the resultant slurry was filtered through Toyo Roshi No. 2 filter paper (manufactured by Advantis), and the remaining particles were thoroughly washed with water and dried in an oven at 110° C. to prepare a self-dispersible carbon black D. Furthermore, the self-dispersible carbon black D thus obtained was dispersed in water to a pigment concentration of 10% to thereby prepare a dispersion liquid. The above method provided a pigment dispersion liquid D with the self-dispersible carbon black D dispersed in water, the self-dispersible carbon black D being formed by introducing a —$C_6H_3$—(COONa)$_2$ group to the carbon black particle surface.

The measured ionic group density of the self-dispersible carbon black D prepared as described above was 1.4 µmol/m$^2$. The method of measuring the ionic group density used at this time was the same as that used for the self-dispersible carbon black A.

(Method of Determining Dispersibility of Colorant in Water-soluble Organic Solvent)

The following experiment was carried out for determining a combination of a colorant and a water-soluble organic solvent constituting an aqueous ink according to the present invention. The combination is as follows. The water-soluble organic solvent undergoes completely or substantially no salvation with a pigment, and an ionic group on the pigment particle surface undergoes completely or substantially no ion dissociation in the water-soluble organic solvent. That is, the colorant can be judged to be substantially non-dispersible in the water-soluble organic solvent.

Examined were combinations of the self-dispersible carbon blacks A to D obtained according to the methods described above and various water-soluble organic solvents. A pulverized substance prepared as follows was used as a colorant. In the process of preparing the pigment dispersion liquids A to D described above, each of the self-dispersible carbon blacks A to D obtained after the drying in an oven at 110° C. was pulverized into a powder in a mortar or the like, and the powder was used as a colorant. Each of those colorants was added to each of the various water-soluble organic solvents to be examined to a colorant concentration of 0.05%, and the mixture was stirred for approximately 1 hour and then observed. At this time, in some of the combinations of the colorants and the water-soluble organic solvents, clear liquid-solid phase separation was visually observed. It can be judged that, in each of such combinations, a water-soluble organic solvent undergoes completely or substantially no solvation with a colorant, an ionic group on the carbon black particle surface undergoes no ion dissociation in the water-soluble organic solvent, and the colorant is substantially non-dispersible in the water-soluble organic solvent.

Furthermore, the following measurement was performed to numerically determine a combination in which a colorant can be judged to be substantially non-dispersible in a water-soluble organic solvent. First, a mixture of each of the colorants described above and each water-soluble organic solvent was allowed to stand still at room temperature for about 100 hours. Then, 50% of the upper part of the liquid phase was collected, and was filtered through a microfilter having a pore size of 1.2 µm. Subsequently, the colorant concentration of the resultant filtrate (colorant solvent dispersion liquid) was measured according to the following method. The following method is merely an example, and the present invention is not limited to the following method.

The colorant concentration of the filtrate was measured according to the following method in terms of absorbance. First, a predetermined amount of pure water was added to a colorant dispersion liquid having a known concentration (Ck%) with a colorant dispersed in water to dilute the dispersion liquid at a predetermined dilution ratio. Then, the absorbance of the diluted dispersion liquid at 550 nm was measured and the measured value was denoted by (ABS1). Subsequently, the colorant solvent dispersion liquid (filtrate) the concentration of which was to be determined was diluted with pure water at the same dilution ratio as the predetermined dilution ratio described above. The absorbance of the diluted colorant solvent dispersion liquid at 550 nm was similarly measured and the measured value was denoted by (ABS2). The colorant concentration of the colorant solvent dispersion liquid (filtrate) can be calculated from the following expression.

Colorant concentration of colorant solvent dispersion liquid (%)=$Ck \times (ABS2)/(ABS1)$ The dispersion rate (%) of a specific colorant in a specific water-soluble organic solvent (hereinafter, referred to as "colorant solvent dispersion rate") was defined as follows by using the ratio between the colorant concentration of the filtrate determined as described above and the initial colorant concentration (0.05% in the above case) of the mixture of the colorant and the water-soluble organic solvent.

Colorant solvent dispersion ratio (%)=(Colorant concentration of colorant solvent dispersion liquid)/(Initial colorant concentration)×100

Table 1 below lists the results of the colorant solvent dispersion rates obtained by the above measurement and the results of the visual observation of the liquid-solid phase separation described earlier. The pigments A to D in the table correspond to the self-dispersible carbon blacks A to D (hereinafter, the carbon blacks are referred to as the pigments A to D).

TABLE 1

Dispersibility of pigment in water-soluble organic solvent

| Colorant | Water-soluble organic solvent | Visual observation of liquid-solid phase separation | Colorant solvent dispersion rate (%) |
| --- | --- | --- | --- |
| Pigment A | Polyethylene glycol 600 | Yes | 2.8 |
| | 1,5-pentanediol | Yes | 1.3 |
| | Ethylene glycol | No | 86.4 |
| | Glycerin | No | 88.3 |
| Pigment B | Polyethylene glycol 600 | Yes | 2.2 |
| | 1,5-pentanediol | Yes | 0.7 |
| | Ethylene glycol | No | 84.9 |
| | Glycerin | No | 85.4 |
| Pigment C | Polyethylene glycol 600 | No | 18.2 |
| | 1,5-pentanediol | No | 43.5 |
| | Ethylene glycol | No | 95.7 |
| | Glycerin | No | 99.4 |
| Pigment D | Polyethylene glycol 600 | No | 17.1 |
| | 1,5-pentanediol | No | 40.6 |
| | Ethylene glycol | No | 92.5 |
| | Glycerin | No | 99.7 |

It can be judged from the results shown in Table 1 that, in each of the combination of the pigment A and polyethylene glycol 600, the combination of the pigment A and 1,5-pentanediol, the combination of the pigment B and polyethylene glycol 600, and the combination of the pigment B and 1,5-pentanediol, a water-soluble organic solvent undergoes completely or substantially no solvation with a colorant, an ionic group of the colorant undergoes completely or substantially no ion dissociation in the water-soluble organic solvent, and the colorant is substantially non-dispersible in the water-soluble organic solvent.

Furthermore, in addition to the above judgment, the judgment as to whether each of the above colorants undergoes completely or substantially no solvation with a target water-soluble organic solvent, and the judgment as to whether an ionic group on the colorant particle surface undergoes completely or substantially no ion dissociation in the target water-soluble organic solvent were made according to the respective methods described below.

Specifically, first, were prepared a variety of liquids [liquid 1] each composed of a surfactant of the following structural formula (1) or (2) and water and having a surfactant concentration of 2 mmol/kg, and a variety of liquids

[liquid 2] each composed of the surfactant, a pigment (any one of the pigments A to D) and water, having a surfactant concentration of 2 mmol/kg and having a colorant concentration of 5% by mass. The liquids 1 and 2 were prepared by mixing the respective components and stirring the components at room temperature for about 30 minutes.

Structural Formula (1)

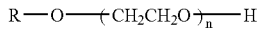

(In Structural Formula (1), above, R represents an alkyl group and n represents an integer.)

Structural Formula (2)

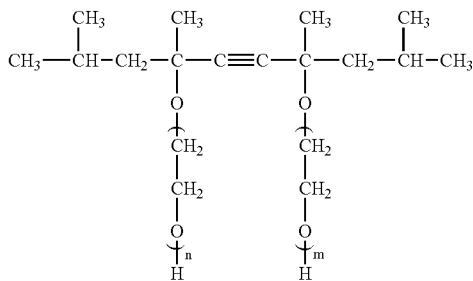

(In Structural Formula (2) above, m and n each represent an integer.)

The surface tensions of liquids prepared by adding the above pigments A to D to water to a pigment concentration of 5% by mass were measured at room temperature. All the measured values were comparable to the surface tension of water at room temperature (72 mN/m). Those results confirmed that the pigments A to D themselves have no effect of reducing the surface tension of a liquid.

Table 2 shows the measurements of the surface tensions of the [liquid 1] and [liquid 2] described above and the differences in surface tension between the [liquid 2] and the [liquid 1].

TABLE 2

Measurements of surface tensions of [liquid 2] and [liquid 1]

| Colorant | Surfactant used | | | | Surface tension A of [liquid 1] (mN/m) | Surface tension B of [liquid 2] (mN/m) | B − A (mN/m) |
|---|---|---|---|---|---|---|---|
| | Structural formula | R | n | m + n | | | |
| Pigment A | (1) | $C_{16}H_{33}$ | 20 | — | 40.0 | 41.3 | 1.3 |
| | (1) | $C_{16}H_{33}$ | 40 | — | 47.9 | 48.7 | 0.8 |
| | (2) | — | — | 4 | 34.2 | 38.8 | 4.6 |
| | (2) | — | — | 10 | 37.0 | 40.1 | 3.1 |
| | (2) | — | — | 30 | 42.7 | 45.9 | 3.2 |
| Pigment B | (1) | $C_{16}H_{33}$ | 20 | — | 40.0 | 40.4 | 0.4 |
| | (1) | $C_{16}H_{33}$ | 40 | — | 47.9 | 48.1 | 0.2 |
| | (2) | — | — | 4 | 34.2 | 38.0 | 3.8 |
| | (2) | — | — | 10 | 37.0 | 39.3 | 2.3 |
| | (2) | — | — | 30 | 42.7 | 45.0 | 2.3 |
| Pigment C | (1) | $C_{16}H_{33}$ | 20 | — | 40.0 | 70.5 | 30.5 |
| | (1) | $C_{16}H_{33}$ | 40 | — | 47.9 | 65.1 | 17.2 |
| | (2) | — | — | 4 | 34.2 | 66.5 | 32.3 |
| | (2) | — | — | 10 | 37.0 | 67.7 | 30.7 |
| | (2) | — | — | 30 | 42.7 | 58.2 | 15.5 |
| Pigment D | (1) | $C_{16}H_{33}$ | 20 | — | 40.0 | 69.6 | 29.6 |
| | (1) | $C_{16}H_{33}$ | 40 | — | 47.9 | 60.4 | 12.5 |
| | (2) | — | — | 4 | 34.2 | 60.2 | 26.0 |
| | (2) | — | — | 10 | 37.0 | 61.4 | 24.4 |
| | (2) | — | — | 30 | 42.7 | 55.0 | 12.3 |

As can be seen from the results of Table 2, in the pigment A and the pigment B, the differences B—A between the surface tensions B of the [liquids 2] and the surface tensions A of the [liquids 1] showed smaller values than those of the pigment C and the pigment D. This finding means that, in the pigment A and the pigment B, the effective concentrations of the surfactant contributing to a reduction in the surface tension of a liquid are nearly equal irrespective of whether a colorant is present or absent. In other words, it is judged that the surfactant does not adsorb to the pigment A and the pigment B at all or substantially. Because of the above-described reason, the pigment A and the pigment B can be judged to be colorants that cause completely or substantially no solvation with a medium such as a water-soluble organic solvent.

Subsequently made according to the following method was the judgment as to whether an ionic group of the pigment that undergoes completely or substantially no salvation with a medium such as a water-soluble organic solvent undergoes completely or substantially no ion dissociation in the water-soluble organic solvent. A description will be made by taking the pigment B as an example.

Specifically, first, the pigment B was diluted with various water-soluble organic solvents to a very low concentration to prepare evaluation liquids. The degree to which the pigment B was diluted was such that the respective particles could be sufficiently observed with a microscope-type zeta potential meter to be described later. For each of the evaluation liquids prepared as described above, a microscope-type zeta potential meter (trade name: ZEECOM; manufactured by Microtec Nition) capable of actually observing the particle movement was used to observe whether particles moved in a specific direction when a voltage was applied to the particles.

As a result of the above observation, clear electrophoresis was observed in an evaluation liquid using a water-soluble organic solvent such as ethylene glycol or glycerin. On the other hand, no particle movement in a specific direction was observed in an evaluation liquid using a water-soluble organic solvent such as polyethylene glycol 600, so that it was judged that substantially no electrophoresis occurred. In other words, it can be judged that, in such a water-soluble organic solvent, an ionic group on the particle surface of the pigment B undergoes completely or substantially no ion dissociation in the water-soluble organic solvent for the above-described reason.

[Method of Investigating Ink with Unknown Identity]

The use of the above-described judgment method allows one to distinguish whether ink with an unknown identity [ink under investigation] is a target product of the present invention. How to distinguish is described below. Specifically, first, the kind and amount of water-soluble organic solvent in the [ink under investigation] are identified. For example, the [ink under investigation] diluted with methanol to a predetermined concentration is analyzed with a GC/MS (trade name: TRACE DSQ; manufactured by ThermoQuest) to identify the kind and amount of water-soluble organic solvent in the [ink under investigation].

Next, the colorant component is collected from the [ink under investigation]. At this time, it is preferable to remove components except the colorant such as the solvent, surfactant, and additive in the ink as much as possible. An example of a method of isolating a colorant from the components except the colorant is as follows. First, the [ink under investigation] is diluted with pure water by a factor of about 10. Then, the diluted ink is subjected to ultrafiltration by using an ultrafilter (trade name: Centramate Low Volume; manufactured by PALL) and a filter having a molecular cutoff of 300,000 until the liquid amount becomes the original amount, and water-soluble components except the colorant are isolated to the outside of the system together with the filtrate. The above process is repeated several times, whereby a liquid mainly composed of the colorant and pure water is obtained. The above process is preferably repeated until the filtrate contains nearly no water-soluble components other than the colorant such as the solvent, surfactant, and additive in the ink.

Next, the thus-obtained liquid mainly composed of the colorant and water is dried (for example, in a 60° C. environment) to remove water. After that, the remainder is pulverized in a mortar or the like into a powder mainly composed of the colorant. If necessary, trace amounts of components except the colorant can be removed by drying the powder in a reduced pressure and high temperature (for example, 100° C.) environment (for 24 hours, for example). The above series of operations can provide a colorant extracted from the [ink under investigation].

Then, the colorant extracted from the [ink under investigation] and the water-soluble organic solvent in the [ink under investigation] identified according to the above method are used to carry out a test in conformance with the above-described judgment method, thereby distinguishing whether the ink with an unknown identity [ink under investigation] is a target product of the present invention.

The above operations and judgment were performed on the inks of the examples and comparative examples to be described later. As a result, valid judgment results were obtained. It was confirmed that the above operations and judgment method are effective for the distinction as to whether ink with an unknown identity [ink under investigation] is a target product of the present invention.

<Examples 1 to 4 and Comparative Examples 1 to 8>

Components shown in Table 3 and Table 4 were mixed with the pigment dispersion liquids A to D prepared as described above, and the mixtures were thoroughly stirred to dissolve or disperse the components in the dispersion liquids. After that, the resultant dispersion liquids were filtered under pressure through a microfilter having a pore size of 3.0 μm (manufactured by Fuji Film Co., Ltd.) to prepare inks of Examples 1 to 4 and Comparative Examples 1 to 8.

TABLE 3

Ink compositions of Examples 1 to 4

| | Formulation (%) Example | | | |
|---|---|---|---|---|
| | 1 | 2 | 3 | 4 |
| Pigment dispersion liquid A | 45 | 45 | — | — |
| Pigment dispersion liquid B | — | — | 45 | 45 |
| Polyethylene glycol 600 | 15 | — | 15 | — |
| 1,5-pentanediol | — | 15 | — | 15 |
| Acetylene glycol EO adduct (*) | 0.1 | 0.1 | 0.1 | 0.1 |
| Pure water | 39.9 | 39.9 | 39.9 | 39.9 |

(*) Trade name: Acetylenol E-100

TABLE 4

Ink compositions of Comparative Examples 1 to 8

| | Formulation (%) Comparative Example | | | | | | | |
|---|---|---|---|---|---|---|---|---|
| | 1 | 2 | 3 | 4 | 5 | 6 | 7 | 8 |
| Pigment dispersion liquid A | 45 | 45 | — | — | — | — | — | — |
| Pigment dispersion liquid B | — | — | 45 | 45 | — | — | — | — |
| Pigment dispersion liquid C | — | — | — | — | 45 | 45 | — | — |
| Pigment dispersion liquid D | — | — | — | — | — | — | 45 | 45 |
| Glycerin | 15 | — | 15 | — | — | — | — | — |
| Ethylene glycol | — | 15 | — | 15 | — | — | — | — |
| Polyethylene glycol 600 | — | — | — | — | 15 | — | 15 | — |

TABLE 4-continued

Ink compositions of Comparative Examples 1 to 8

| | Formulation (%) Comparative Example | | | | | | | |
|---|---|---|---|---|---|---|---|---|
| | 1 | 2 | 3 | 4 | 5 | 6 | 7 | 8 |
| 1,5-pentanediol | — | — | — | — | — | 15 | — | 15 |
| Acetylene glycol EO adduct (*) | 0.1 | 0.1 | 0.1 | 0.1 | 0.25 | 0.25 | 0.25 | 0.25 |
| Pure water | 39.9 | 39.9 | 39.9 | 39.9 | 39.75 | 39.75 | 39.75 | 39.75 |

(*) Trade name: Acetylenol E-100

<Evaluation>

The inks of Examples 1 to 4 and Comparative Examples 1 to 8 were evaluated for the following items by using a modified ink-jet recording apparatus BJS-700 (manufactured by Canon Inc.) having an on-demand multi-head recording head for ejecting ink through application of thermal energy to the ink in response to a recording signal. Table 5 shows the evaluation results.

1. Print Density

Each of the above inks and the above-mentioned ink-jet recording apparatus were used to print letters including a solid portion measuring 2 cm×2 cm on each of sheets A to E of plain paper for copying to be described later. A day after the printing, the printing density of the solid portion measuring 2 cm×2 cm was measured. The printer driver was operated in its default mode. Setting conditions for the default mode are shown below. In addition, the ejection amount per dot of ink is 30 ng with an uncertainty of ±10% or less. The printing density of each image was measured by using a reflection densitometer Macbeth RD-918 (manufactured by Macbeth).

Type of paper: Plain paper
Printing quality: Standard
Color adjustment: Automatic The printing densities obtained as a result of the measurement as described above were used to evaluate the inks on the basis of the following criteria.

O: The average printing density of 5 sheets is 1.4 or more.
X: The average printing density of 5 sheets is less than 1.4.

The following five sheets were used as the copying paper in the above image output test.

A: PPC paper NSK manufactured by Canon Inc.
B: PPC paper NDK manufactured by Canon Inc.
C: PPC paper 4024 manufactured by Fuji Xerox Co., Ltd.
D: PPC paper Prober Bond manufactured by Fox River Paper Co.
E: PPC paper for Canon manufactured by Neusiedler Co.

TABLE 5

Evaluation results of printing density

| | Printing density |
|---|---|
| Example 1 | O |
| Example 2 | O |
| Example 3 | O |
| Example 4 | O |
| Comparative Example 1 | X |
| Comparative Example 2 | X |
| Comparative Example 3 | X |
| Comparative Example 4 | X |
| Comparative Example 5 | X |

TABLE 5-continued

Evaluation results of printing density

| | Printing density |
|---|---|
| Comparative Example 6 | X |
| Comparative Example 7 | X |
| Comparative Example 8 | X |

2. Bleeding Resistance

The inks of Examples 1 to 4 and Comparative Examples 1 to 8 as black inks were used in combination with color inks to perform image formation. The color (three colors of cyan, magenta, and yellow) inks were prepared as follows.

(Preparation of Cyan Ink)

The following components were mixed and thoroughly stirred to prepare a solution. Then, the solution was filtered under pressure through a microfilter having a pore size of 0.2 μm (manufactured by Fuji Film Co., Ltd.) to prepare a cyan ink.

| DBL (Direct Blue) 199 | 3.5 parts |
|---|---|
| Glycerin | 7.5 parts |
| Diethylene glycol | 7.5 parts |
| Acetylenol E-100 | 1.0 part |
| Pure water | 80.5 parts |

(Preparation of Magenta Ink)

A magenta ink was prepared similarly to the cyan ink by using the following components.

| AR (Acid Red) 289 | 2.5 parts |
|---|---|
| Glycerin | 7.5 parts |
| Diethylene glycol | 7.5 parts |
| Acetylenol E-100 | 1.0 part |
| Pure water | 81.5 parts |

(Preparation of Yellow Ink)

A yellow ink was similarly prepared by using the following components.

| DY (Direct Yellow) 86 | 2.5 parts |
|---|---|
| Glycerin | 7.5 parts |
| Diethylene glycol | 7.5 parts |

-continued

| | |
|---|---|
| Acetylenol E-100 | 1.0 part |
| Pure water | 81.5 parts |

Combined as shown in Table 6 below were each black ink of Examples 1 to 4 and Comparative Examples 1 to 8, the color inks prepared as described above, and the above-mentioned ink-jet recording apparatus having an on-demand multi-head recording head as shown in FIG. 9 or FIG. 10 for ejecting ink through application of thermal energy to the ink in response to a recording signal. Then, printing evaluation of Examples 5 to 12 and Comparative Examples 9 to 16 was performed.

TABLE 6

Black inks and heads used

| | Black ink | Head configuration |
|---|---|---|
| Example 5 | Example 1 | FIG. 9 |
| Example 6 | Example 2 | FIG. 9 |
| Example 7 | Example 3 | FIG. 9 |
| Example 8 | Example 4 | FIG. 9 |
| Example 9 | Example 1 | FIG. 10 |
| Example 10 | Example 2 | FIG. 10 |
| Example 11 | Example 3 | FIG. 10 |
| Example 12 | Example 4 | FIG. 10 |
| Comparative Example 9 | Comparative Example 1 | FIG. 10 |
| Comparative Example 10 | Comparative Example 2 | FIG. 10 |
| Comparative Example 11 | Comparative Example 3 | FIG. 10 |
| Comparative Example 12 | Comparative Example 4 | FIG. 10 |
| Comparative Example 13 | Comparative Example 5 | FIG. 10 |
| Comparative Example 14 | Comparative Example 6 | FIG. 10 |
| Comparative Example 15 | Comparative Example 7 | FIG. 10 |
| Comparative Example 16 | Comparative Example 8 | FIG. 10 |

A black solid portion and a solid portion of each color (yellow, magenta, or cyan) were printed adjacent to each other on plain paper by using an ink-jet recording apparatus having a recording head as shown in FIG. 9 and FIG. 10. The degree of bleeding at a boundary portion between the black solid portion and a color solid portion was visually observed and evaluated on the basis of the following criteria. PB-Paper (NSK paper) manufactured by Canon Inc. was used as the plain paper. Table 7 shows the evaluation results.

AA: No bleeding is observed.

A: Bleeding is nearly inconspicuous.

B: Bleeding does occur, but a boundary line between colors is identifiable.

C: Bleeding occurs to such an extent that a boundary line between colors is unclear.

TABLE 7

Evaluation results of bleeding resistance

| | Bleeding resistance |
|---|---|
| Example 5 | A |
| Example 6 | A |
| Example 7 | A |

TABLE 7-continued

Evaluation results of bleeding resistance

| | Bleeding resistance |
|---|---|
| Example 8 | A |
| Example 9 | AA |
| Example 10 | AA |
| Example 11 | AA |
| Example 12 | AA |
| Comparative Example 9 | C |
| Comparative Example 10 | C |
| Comparative Example 11 | C |
| Comparative Example 12 | C |
| Comparative Example 13 | C |
| Comparative Example 14 | C |
| Comparative Example 15 | C |
| Comparative Example 16 | C |

What is claimed is:

1. An aqueous ink comprising water, at least one water-soluble organic solvent, and a colorant, wherein the colorant comprises a pigment containing a pigment particle having at least one ionic group bonded to a surface of the pigment particle directly or via another atomic group, wherein the at least one organic solvent, and any other water-soluble organic solvent in the ink, undergoes completely or substantially no solvation with the pigment and the ionic group on the surface of the pigment particle undergoes completely or substantially no ion dissociation in the at least one organic solvent, and any other water-soluble organic solvent in the ink, wherein the pigment satisfies a relationship of $B-A \leqq 10$ where A represents a surface tension (mN/m) of a liquid composed of a surfactant and water and having a surfactant concentration of 2 mmol/kg, and B represents a surface tension (mN/m) of a liquid composed of the surfactant, the pigment and water, having a surfactant concentration of 2 mmol/kg and having a pigment concentration of 5% by mass, and wherein the content of the water-soluble organic solvent is twice or more as large as the content of the pigment in terms of a mass ratio.

2. The aqueous ink according to claim 1, wherein the surfactant has a structure represented by the following Structural Formula (1):

Structural Formula (1)

$$R-O-(CH_2CH_2O)_n-H$$

wherein in Structural Formula (1), R represents an alkyl group and n represents an integer.

3. The aqueous ink according to claim 1, wherein the surfactant has a structure represented by the following Structural Formula (2):
Structural Formula (2)

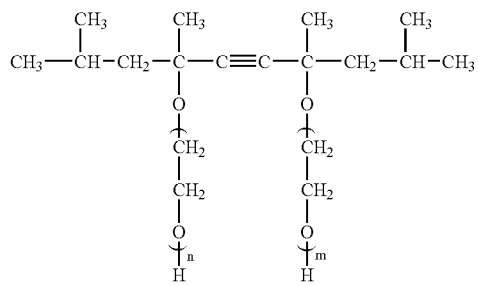

wherein, in Structural Formula (2), m and n each represent an integer.

4. The aqueous ink according to claim 1, wherein the ionic group is —COOM1 where M1 represents a hydrogen atom, an alkali metal, ammonium, or organic ammonium.

5. The aqueous ink according to claim 1, wherein the atomic group is one group selected from the group consisting of an alkylene group having 1 to 12 carbon atoms, a substituted or unsubstituted phenylene group, and a substituted or unsubstituted naphthylene group.

6. The aqueous ink according to claim 1, wherein the pigment particle is of carbon black.

7. The aqueous ink according to claim 1, wherein the aqueous ink is for ink-jet recording.

8. An ink-jet recording method comprising ejecting the aqueous ink according to claim 7 by an ink-jet recording system.

9. An ink-jet recording apparatus comprising:
an ink-containing portion that contains the aqueous ink according to claim 7; and
a recording head for ejecting the ink.

10. An image forming method for performing recording on plain paper by an ink-jet recording system by using a black ink and at least one aqueous color ink, the method comprising:
performing a scan for applying the aqueous ink according to claim 7 as the black ink to form an image; and
performing a scan for applying the color ink on an area where the image is formed by the black ink to form an image composed of the image formed by the black ink and the image formed by the color ink adjacent to each other.

11. The image forming method according to claim 10, wherein the scan for applying the color ink is performed after at least one scan interval after the scan for applying the black ink is performed.

12. The image forming method according to claim 10, wherein an ink is applied by using a recording head in which a black ink ejection orifice line and a color ink ejection orifice line are so arranged as to be shifted from each other in a sub-scanning direction.

13. An aqueous ink comprising water, at least one water-soluble organic solvent, and a carbon black as a pigment containing a pigment particle,
wherein the carbon black has at least one ionic group bonded to a surface of the pigment particle directly or via another atomic group,
wherein the at least one organic solvent, and any other water-soluble organic solvent in the ink, undergoes completely or substantially no solvation with the pigment particle and the ionic group of the pigment particle undergoes completely or substantially no ion dissociation in the at least one organic solvent, and any other water-soluble organic solvent in the ink, and
wherein the pigment satisfies a relationship of $B-A \leqq 10$ where A represents a surface tension (mN/m) of a liquid composed of a surfactant and water and having a surfactant concentration of 2 mmol/kg, and B represents a surface tension (mN/m) of a liquid composed of the surfactant, the pigment and water, having a surfactant concentration of 2 mmol/kg and having a pigment concentration of 5% by mass,
wherein the content of the water-soluble organic solvent is twice or more as large as the content of the pigment in terms of a mass ratio.

14. An aqueous ink comprising water, at least one water-soluble organic solvent, and a self-dispersible carbon black as a pigment containing a pigment particle,
wherein the carbon black has at least one ionic group bonded to a surface of the pigment particle directly or via another atomic group,
wherein the at least one organic solvent, and any other water-soluble organic solvent in the ink, undergoes completely or substantially no solvation with the pigment particle and the ionic group of the pigment particle undergoes completely or substantially no ion dissociation in the at least one organic solvent, and any other water-soluble organic solvent in the ink, and
wherein the pigment satisfies a relationship of $B-A \leqq 10$ where A represents a surface tension (mN/m) of a liquid composed of a surfactant and water and having a surfactant concentration of 2 mmol/kg, and B represents a surface tension (mN/m) of a liquid composed of the surfactant, the pigment and water, having a surfactant concentration of 2 mmol/kg and having a pigment concentration of 5% by mass,
wherein the content of the water-soluble organic solvent is twice or more as large as the content of the pigment in terms of a mass ratio.

* * * * *